(12) United States Patent
Lawson et al.

(10) Patent No.: US 9,491,309 B2
(45) Date of Patent: *Nov. 8, 2016

(54) SYSTEM AND METHOD FOR RUNNING A MULTI-MODULE TELEPHONY APPLICATION

(71) Applicant: Twilio, Inc., San Francisco, CA (US)

(72) Inventors: Jeff Lawson, San Francisco, CA (US); John Wolthuis, San Francisco, CA (US); Evan Cooke, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/933,306

(22) Filed: Nov. 5, 2015

(65) Prior Publication Data

US 2016/0057289 A1    Feb. 25, 2016

Related U.S. Application Data

(63) Continuation of application No. 14/076,845, filed on Nov. 11, 2013, now Pat. No. 9,210,275, which is a continuation-in-part of application No. 12/900,411, filed on Oct. 7, 2010, now Pat. No. 8,582,737.

(60) Provisional application No. 61/249,491, filed on Oct. 7, 2009, provisional application No. 61/783,134, filed on Mar. 14, 2013.

(51) Int. Cl.
   *H04M 15/00*   (2006.01)

(52) U.S. Cl.
   CPC .............. *H04M 15/43* (2013.01); *H04M 15/41* (2013.01); *H04M 15/51* (2013.01); *H04M 15/61* (2013.01); *H04M 15/68* (2013.01); *H04M 15/8228* (2013.01)

(58) Field of Classification Search
   CPC ...................................................... H04M 15/51
   USPC ................ 379/111–141; 370/352; 455/432.1
   See application file for complete search history.

(56) References Cited

U.S. PATENT DOCUMENTS 5,274,700 A    12/1993   Gechter et al.
5,526,416 A     6/1996   Dezonno et al.
(Continued)

FOREIGN PATENT DOCUMENTS

DE    1684587 A    3/1971
EP    0282126 A    9/1988
(Continued)

OTHER PUBLICATIONS

Complaint for Patent Infringement, *Telinit Technologies, LLC* v. *Twilio Inc.*, dated Oct. 12, 2012.

(Continued)

*Primary Examiner* — MD S Elahee
(74) *Attorney, Agent, or Firm* — Jeffrey Schox

(57) ABSTRACT

A system and method of a telephony application platform can include receiving a communication session request specifying a destination endpoint, connecting the communication session through a first application module according to the destination endpoint, receiving an instruction to transition communication control to a second application module, transitioning communication control of the communication session to the second application module, independently metering resource usage of the communication session of each application module, and accounting the metered usage of the communication session.

20 Claims, 20 Drawing Sheets

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Orolin et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,065,637 B1 | 6/2006 | Nanja |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,890 B1 | 2/2008 | Partovi et al. |
| 7,340,040 B1 | 3/2008 | Saylor et al. |
| 7,369,865 B2 | 5/2008 | Gabriel et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |

(56) References Cited

U.S. PATENT DOCUMENTS

| | | |
|---|---|---|
| 7,657,434 B2 | 2/2010 | Thompson et al. |
| 7,672,295 B1 | 3/2010 | Andhare et al. |
| 7,675,857 B1 | 3/2010 | Chesson |
| 7,715,547 B2 | 5/2010 | Ibbotson et al. |
| 7,742,499 B1 | 6/2010 | Erskine et al. |
| 7,875,836 B2 | 1/2011 | Imura et al. |
| 7,882,253 B2 | 2/2011 | Pardo-Castellote et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 | 9/2011 | Raleigh |
| 8,024,785 B2 | 9/2011 | Andress et al. |
| 8,046,823 B1 | 10/2011 | Begen et al. |
| 8,069,096 B1 | 11/2011 | Ballaro et al. |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,139,730 B2 | 3/2012 | Da Palma et al. |
| 8,150,918 B1 | 4/2012 | Edelman et al. |
| 8,156,213 B1 | 4/2012 | Deng et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,238,533 B2 | 8/2012 | Blackwell et al. |
| 8,243,889 B2 | 8/2012 | Taylor et al. |
| 8,266,327 B2 | 9/2012 | Kumar et al. |
| 8,306,021 B2 | 11/2012 | Lawson et al. |
| 8,315,198 B2 | 11/2012 | Corneille et al. |
| 8,319,816 B1 | 11/2012 | Swanson et al. |
| 8,346,630 B1 | 1/2013 | Mckeown |
| 8,355,394 B2 | 1/2013 | Taylor et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,565,117 B2 | 10/2013 | Hilt et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,649,268 B2 | 2/2014 | Lawson et al. |
| 8,667,056 B1 | 3/2014 | Proulx et al. |
| 8,695,077 B1 | 4/2014 | Gerhard et al. |
| 8,755,376 B2 | 6/2014 | Lawson et al. |
| 8,767,925 B2 | 7/2014 | Sureka et al. |
| 8,806,024 B1 | 8/2014 | Francis et al. |
| 8,837,465 B2 | 9/2014 | Lawson et al. |
| 8,838,707 B2 | 9/2014 | Lawson et al. |
| 8,861,510 B1 | 10/2014 | Fritz |
| 8,879,547 B2 | 11/2014 | Maes |
| 8,938,053 B2 | 1/2015 | Cooke et al. |
| 8,948,356 B2 | 2/2015 | Nowack et al. |
| 8,964,726 B2 | 2/2015 | Lawson et al. |
| 9,014,664 B2 | 4/2015 | Kim et al. |
| 9,015,702 B2 | 4/2015 | Bhat |
| 9,344,573 B2 | 5/2016 | Wolthuis et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097447 A1 | 5/2003 | Johnston |
| 2003/0097639 A1 | 5/2003 | Niyogi et al. |
| 2003/0123640 A1 | 7/2003 | Roelle et al. |
| 2003/0195950 A1 | 10/2003 | Huang et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0071275 A1 | 4/2004 | Bowater et al. |
| 2004/0101122 A1 | 5/2004 | Palma et al. |
| 2004/0102182 A1 | 5/2004 | Reith et al. |
| 2004/0117788 A1 | 6/2004 | Karaoguz et al. |
| 2004/0165569 A1 | 8/2004 | Sweatman et al. |
| 2004/0172482 A1 | 9/2004 | Weissman et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0228469 A1 | 11/2004 | Andrews et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | DeHamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0135578 A1 | 6/2005 | Ress et al. |
| 2005/0141500 A1 | 6/2005 | Bhandari et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |

(56) References Cited

U.S. PATENT DOCUMENTS

| | | |
|---|---|---|
| 2006/0203979 A1 | 9/2006 | Jennings |
| 2006/0209695 A1 | 9/2006 | Archer et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2008/0005275 A1 | 1/2008 | Overton et al. |
| 2008/0037746 A1 | 2/2008 | Dufrene et al. |
| 2008/0040484 A1 | 2/2008 | Yardley |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276771 A1 | 11/2009 | Nickolov et al. |
| 2009/0288012 A1 | 11/2009 | Hertel et al. |
| 2009/0300194 A1 | 12/2009 | Ogasawara |
| 2009/0318112 A1 | 12/2009 | Vasten |
| 2010/0027531 A1 | 2/2010 | Kurashima |
| 2010/0037204 A1 | 2/2010 | Lin et al. |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0151884 A1 | 6/2011 | Zhao |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |

(56) References Cited

U.S. PATENT DOCUMENTS

| | | |
|---|---|---|
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma et al. |
| 2011/0274111 A1 | 11/2011 | Narasappa et al. |
| 2011/0276892 A1 | 11/2011 | Jensen-Horne et al. |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0110564 A1 | 5/2012 | Ran et al. |
| 2012/0149404 A1 | 6/2012 | Beattie et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179907 A1 | 7/2012 | Byrd et al. |
| 2012/0180071 A1 | 7/2012 | Byrd et al. |
| 2012/0180029 A1 | 7/2012 | Hill et al. |
| 2012/0201238 A1 | 8/2012 | Lawson et al. |
| 2012/0208495 A1 | 8/2012 | Lawson et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0036476 A1 | 2/2013 | Roever et al. |
| 2013/0047232 A1 | 2/2013 | Tuchman et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0365480 A1 | 12/2015 | Soto et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| EP | 2053869 A1 | 4/2009 |
| ES | 2134107 A | 9/1999 |
| WO | 02087804 | 11/2002 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

Kim et al. "In-service Feedback QoE Framework" 2010 Third International Conference on Communication Theory. Reliability and Quality of Service. pp. 135-138. 2010.

Matos et al. "Quality of Experience-based Routing in Multi-Service Wireless Mesh Networks" Realizing Advanced Video Optimized Wireless Networks. IEEE. pp. 7060-7065. 2012.

NPL, "API Monetization Platform", 2013.

RFC 3986: Uniform Resource Identifier (URI): Generic Syntax; T. Berners-Lee, R. Fielding, L. Masinter; Jan. 2005; The Internet Society.

Tran et al. "User to User adaptive routing based on QoE" ICNS 2011: The Seventh International Conference on Networking and Services. pp. 170-177. 2011.

Wu et al. "Quality Evaluation in Peer-to-Peer IPTV Services" Data Traffic and Monitoring Analysis, LNCS 7754. pp. 302-319. 2013.

S. barakovic and L. Skorin-Kapov. "Survey and Challenges of QoE Management Issues in Wireless Networks". 2012, pp. 1-29.

Subramanya, et al. "Digital Signatures", IEEE Potentials, Mar./Apr. 2006, pp. 5-8.

"Ethernet to Token ring Bridge"—Black Box Corporation, Oct. 1999 http://blackboxcanada.com/resource/files/productdetails/17044.pdf.

| Op Mode | $/min | Metered usage (sec) | Op Mode Subtotal |
|---|---|---|---|
| Op Mode 1 | $0.10 | 30 | $0.5 |
| Op Mode 2 | $0.01 | 90 | $0.90 |
| Op Mode 3 | $0.001 | 540 | $0.54 |
| | | TOTAL | $1.94 |

SYSTEM AND METHOD FOR RUNNING A MULTI-MODULE TELEPHONY APPLICATION

CROSS-REFERENCE TO RELATED APPLICATIONS

This application is a continuation of prior U.S. application Ser. No. 14/076,845, filed 11 Nov. 2013, which is a continuation-in-part of prior U.S. application Ser. No. 12/900,411, filed on 7 Oct. 2010, which claims the benefit of U.S. Provisional Application No. 61/249,491, filed 7 Oct. 2009, which are all incorporated in its entirety by this reference.

U.S. application Ser. No. 14/076,845 additionally claims the benefit of U.S. Provisional Application No. 61/783,134, filed 14 Mar. 2013, which is incorporated in its entirety by this reference.

TECHNICAL FIELD

This invention relates generally to the telephony field, and more specifically to a new and useful system and method of a customized telephony application in the telephony field.

BACKGROUND

Traditional telephony applications, such as Interactive Voice Response (IVR) and Private Branch Exchange (PBX) systems, are used to provide customized telephone services (e.g., an automated phone directory, bill paying, or account info). A telephone application is generally launched through phone actions such as pressing a phone key (e.g., "5") or speaking a phrase. Performing a phone action may launch another IVR or PBX server hosting a different application. When using such a system, multiple telephone applications need to be individually configured and integrated to achieve a desired functionality. In some situations a single company will offer a variety of first party applications that are designed to work together, but in this situation, the available application options are often limited. In other situations, the applications are sold and operated by different companies. The applications of different companies may use different telephony hardware and software stacks, which prevents the ability to transfer call state, meta-data, or call control between applications. Additionally, each of these services may have separate billing contracts and operation costs, which not only can become financially expensive, but also is bothersome to manage. Additionally, there are many technology platforms, such as telephony platforms, web service platforms, and other technology platforms, that have numerous third party developing tools on top of, and it is often challenging for the technology platform provider and/or the third party developers to create a profitable product due to the complicated relationship between users, technology providers, and products. Thus, there is a need in the telephony application field to create a new and useful system and method for running a multi-module telephony application. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Running a Multi-Module Telephony Application

Figure 1:
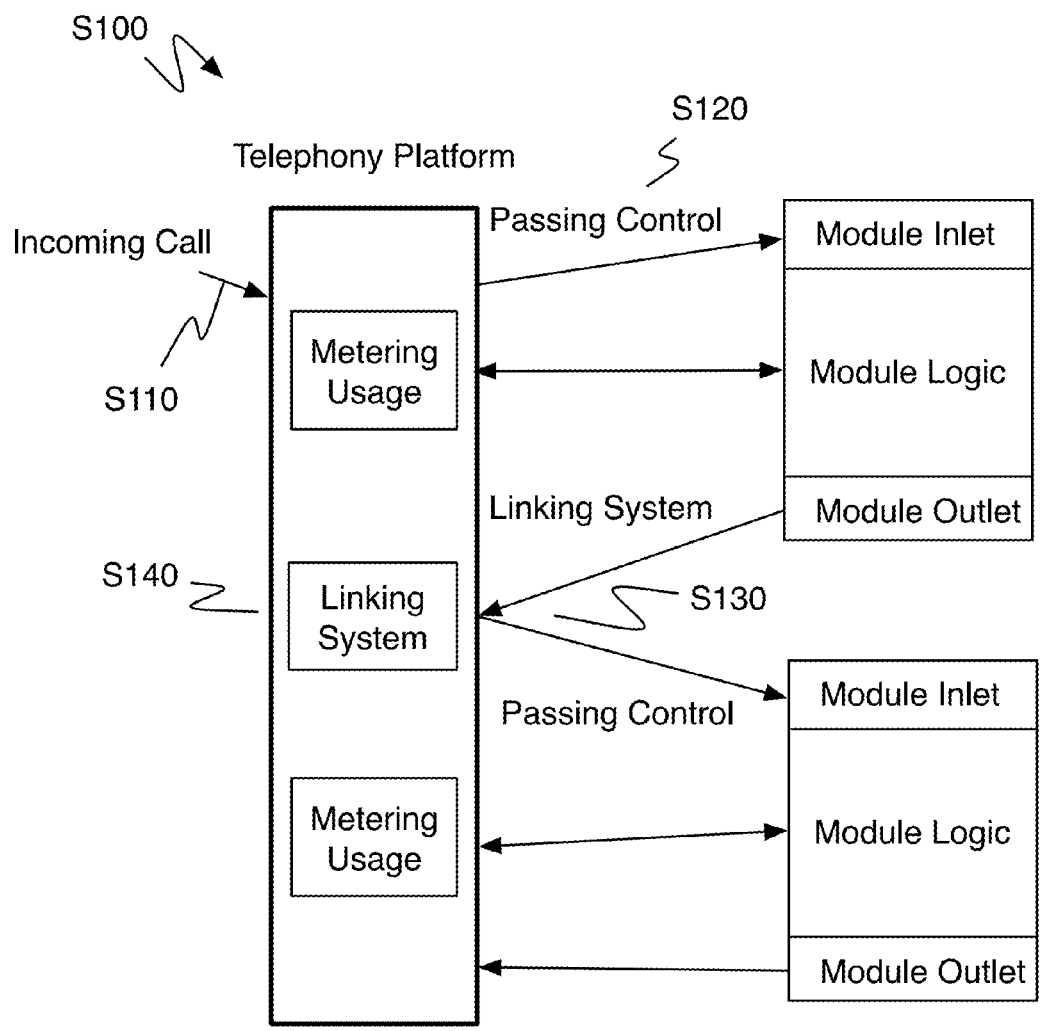
FIG. 1 is a schematic representation of a first preferred embodiment of a deployed customized telephony application.

As shown in FIG. 1, a method S100 for running a multi-module telephony application of a preferred embodiment includes receiving an application request to a number associated with an account of a telephony platform S110; directing application control to a first module of an application of the account S120, passing application control from the first module to a second module of the account through a linking system S130, and metering use of the first module and the at least second module S140. The method S100 functions to allow an application or communication session to have the functionality of multiple modules linked so application control can be passed between modules. The method S100 further functions to allow highly customized telephony applications to use modules (or applets) developed and operated by any suitable party. The modules can preferably be customized within a container app (or some abstraction of overall flow between modules) that determines overall configuration in module flow. The modules or overall flow can alternatively be dynamically activated/invoked during a communication session. The modules may vary in functionality, capability, objective, and performance. The customization process is preferably facilitated by an online store, but any customization environment may alternatively be used. The customization and use of different modules and/or resources can additionally or alternatively be configured into account, application logic, and/or communication flow logic. The customization or use of the modules can additionally be automatically invoked by a communication platform. The method S100 further provides ways for modules to pass parameters and share state information. The different modules may be developed by any suitable entity such as third party developers or operators of the telephony platform. The method S100 is preferably implemented on the telephony platform substantially similar to the communication platform described in U.S. Patent Application publication no. 2009/0252159, filed Apr. 2, 2009, titled "SYSTEM AND METHOD FOR PROCESSING TELEPHONY SESSIONS" which is incorporated in its entirety by this reference, but the method may alternatively be used by any suitable communication platform. The method further functions to enable a module to be used by users on a usage based technology platform. An additional benefit of the method S100 is that usage of a module is individually metered which can preferably be used to simplify the payment process. Preferably, the design of the system, as described below, and the method of use allows for outside developers to easily create and operate telephony application modules without performing complicated tasks to manage state of the call or coordinating with other module developers for how to communicate and collaborate within an application. In another variation, the resources used within a communication platform can be metered individually or as different groups to provide targeted tracking, resource management, and/or billing.

An application and control of an application is preferably active during the communication session. A communication session can be a telephony session (e.g., over PSTN or SIP), a voice call, a video call, mixed protocol session (e.g., one leg connected to PSTN based device and another leg a video call to a client application), a screen sharing session, a synchronous session, a bi-directional text, image, or multimedia conversation session, and/or any suitable bi-directional communication with at least one endpoint. The communication session preferably includes at least one endpoint. For example a communication session can involve one communication endpoint and the communication platform acting as the other node in the communication session. An endpoint is any suitable communication device such as a phone, a SIP phone, a web application, a native client application, or any suitable device. An endpoint preferably includes media inputs and outputs such as a microphone, speaker, keyboard, screen camera, and/or any suitable media component. A communication session preferably has a unique identifier associated with the communication session during the duration of the communication session. When transitioning between modules, the communication identifier preferably remains constant until the communication session ends.

A communication session starts by invoking an application module. A module preferably represents an operational mode. The module preferably includes at least one routine of application logic that dictates how one resource manages or controls the communication session. The application logic can be internally configured in one or more resources, but may alternatively be externally hosted (such as at a URI of an application server). When in control of a communication session, the signaling and media channels of the communication session are preferably routed through the resources of the module. The module can additionally include communication platform resources such as a call router, TTS server, Media server, recording server, SIP routing, databases to support application logic of the module, and/or any suitable resources. A module can preferably dynamically transition between modules without interrupting or stopping the session. This can include performing internal signaling media invites to corresponding resources of the next module (and removing channeling communication through resources of the previous module). A communication session preferably has a history associated with it that can represent which modules were used and the corresponding usage or pattern of use by the module during the communication session. Preferably, usage by a communication session is based on time that the module was in control of the communication session. A rate or usage plan can then be applied to the aggregate usage to calculate a total cost. The total usage is preferably the aggregate usage during the communication. This usage history can be accounted for by account, per phone number/endpoint address, per session, or by any suitable accounting division. Billing and pricing can be based off of such module usage dependent metering. The total cost can additionally be calculated in realtime and be used during an active communication session. For example, a calling card use case could alert the user when the cost of the call is nearing the total allotted cost for the card.

As discussed more below, modules can be different types of classifications of modules. A low-level module can provide basic functionality such as routing or bridging of endpoints and sessions. A platform mid-level module can provide instruction processing capabilities according to a set of platform primitives (i.e., application instructions and/or API calls). Additional resources of the mid-level module can provide TTS, DTMF input detection, media playback, and other suitable functionality. An application high-level module can provide business=logic resources that can serve an application built on top of the platform primitives such as a call center service.

Figure 2:
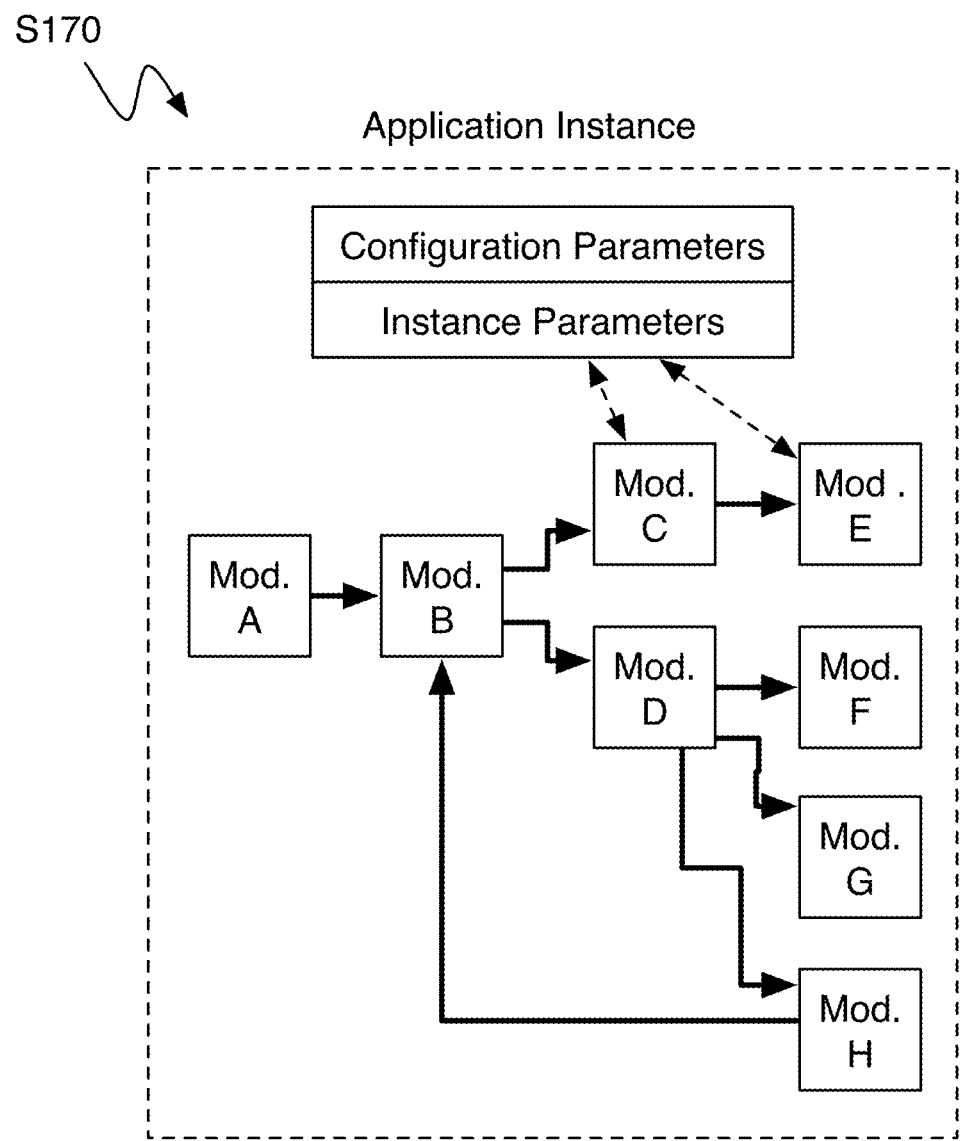
FIG. 2 is a schematic representation of a configured telephony application.
Figure 3:
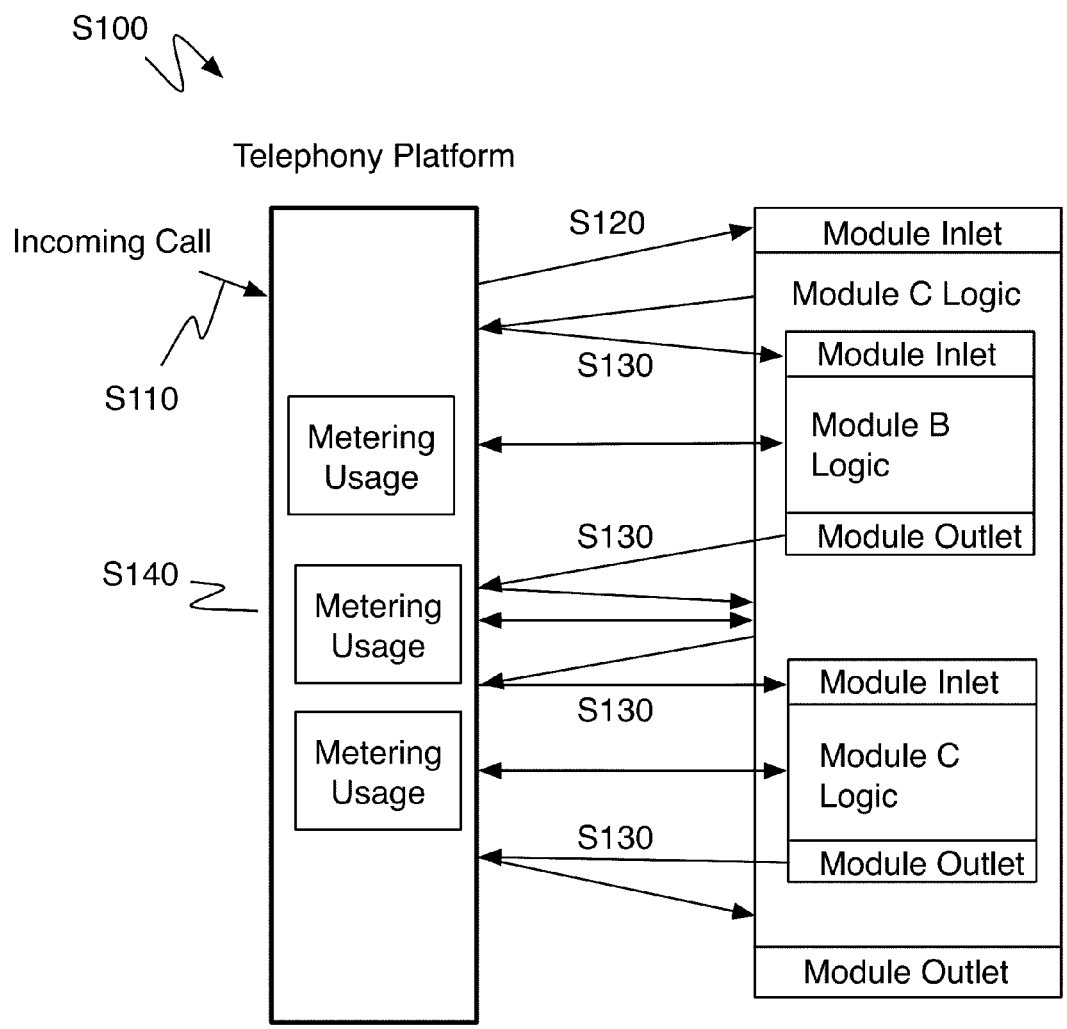
FIG. 3 is a schematic representation of a variation where a first module uses a second and third module within the operation logic of the first module.
Figure 9:
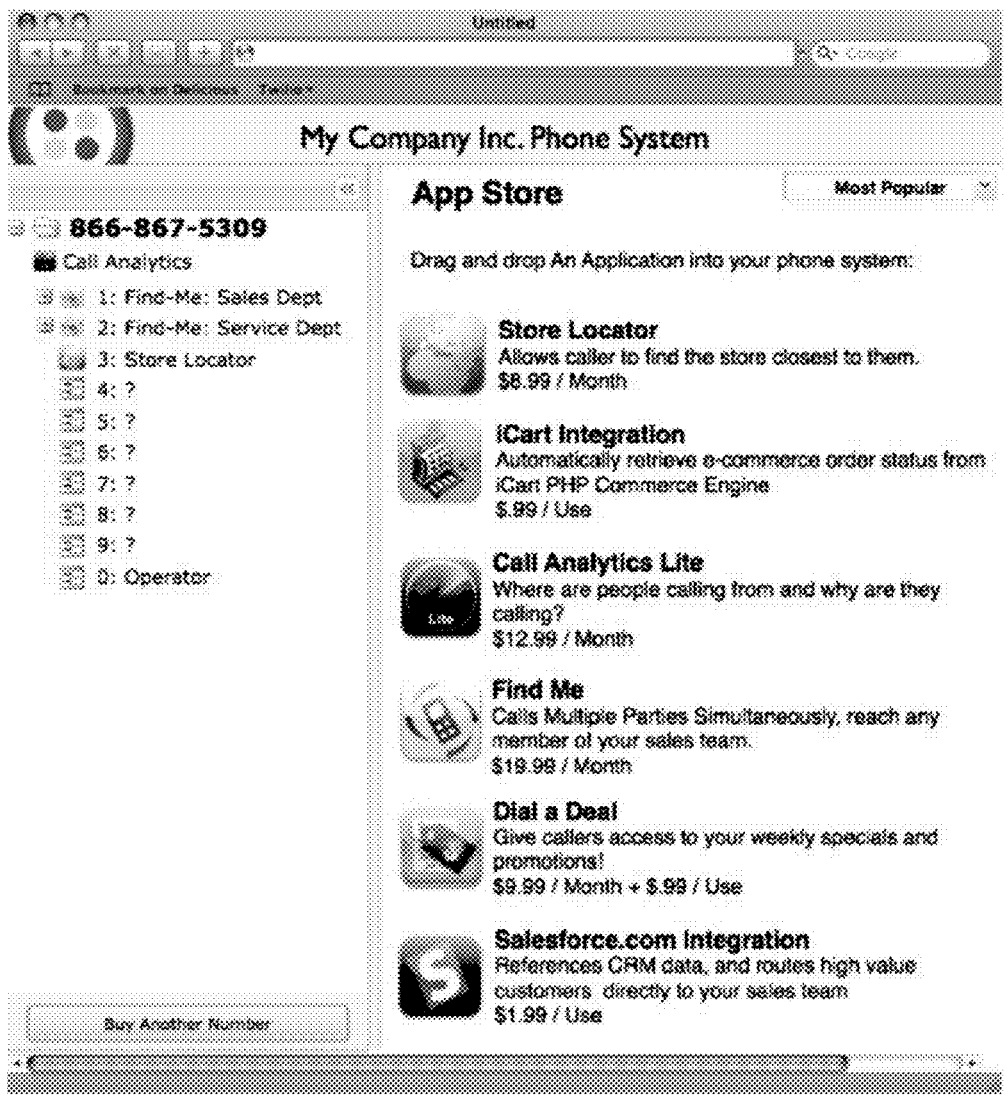
FIGS. 9 and 10 are exemplary representations of screenshots of a customization interface for an application composed of a plurality of modules.
Figure 10:
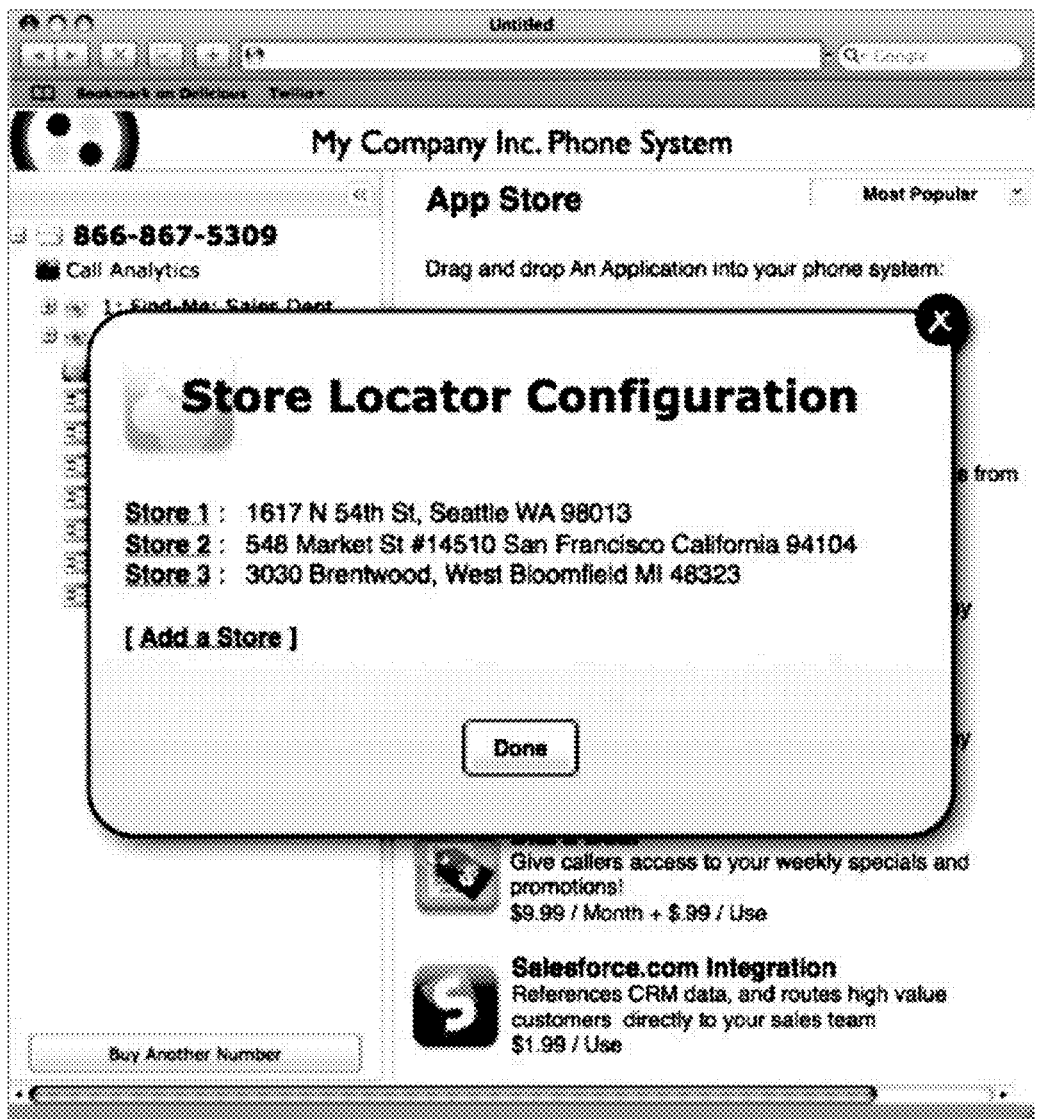

Step S110, which includes receiving an application request to a number associated with an account of a telephony platform, functions to handle an incoming request to the telephony platform. The application request is preferably an incoming phone call which may be a phone call from the public switched telephone network (PSTN), an IP voice or video call (e.g., a SIP or voice over internet protocol (VoIP) call), screen sharing session, or any suitable communication request. The application request can be directed at a phone number, a SIP address, or any suitable endpoint address. The application request is preferably a communication session request, that initiates, establishes, or connects at least one endpoint in a communication session. A communication session can be any suitable bidirectional communication channel between one or more endpoints. A communication session is controlled by at least one application module. The application request may alternatively be a request made from a telephony message such as a message received over short message service (SMS), a multimedia messaging service (MMS), or any suitable messaging service. As another alternative, the application request may be IP based communication, over fax, or any suitable communication channel. Additionally or alternatively, the application request may be initiated from a web application or a server, such as in the example where an outgoing phone call is initiated by the web application. The incoming application request is preferably directed to an application assigned to a phone number. The communication request (e.g., an incoming call or API call request) can alternatively be addressed to any suitable communication endpoint or destination address such as a SIP address, an account name address, or any suitable communication addressable endpoint. The application is preferably composed of at least one module. The at least one module is preferably configured to direct application control to at least one other module. The second module that the first module directs application control to may be determined through the application logic of the module. The modules can be independent application modules but can alternatively be different operational modes of one or more application modules that can use different resources and/or services. More preferably, the application is preconfigured to include a plurality of modules that have a configured flow as shown in FIG. 2. A user customized application which may be described as being defined by a "container application", may be setup through a user interface that links the different modules and defines the functionality and operation parameters of the modules as shown in FIGS. 9 and 10. The modules may be developed by any suitable party. For example, the functionality of an application may utilize one module by a company A, which can pass application control to a second module by company B. These modules are preferably stored outside of the telephony platform (e.g., on a server determined by the respective developers/owners), but the modules may alternatively be stored within the telephony platform. Additionally, similar to how one application may be configured to use a plurality of modules, a module may itself be configured to use a plurality of other modules as shown in FIG. 3. In a similar manner, a telephony session can be routed between different application modules (e.g., different application stack layers) to utilize different resources during different application states. In this variation, the modules include different operational modes of the communication platform that utilize different application logic and/or resources of the communication platform.

Step S120, which includes directing application control to a first module of an application of the account, functions to direct the telephony platform to communicate with the first module to determine application logic. Application control preferably includes a server hosting the module communicating with a call router of the telephony platform or any other suitable portion of a telephony platform. As mentioned above, a communication application is preferably defined by a communication session with a unique communication session identifier. A communication session or instance of application control is preferably defined for a voice call, a video chat session, a text a screen sharing session, a bidirectional text or media messaging session, synchronous communication, and/or any suitable session of bidirectional communication between at least one endpoint and the telephony platform. Directing application control to the first module preferably includes having the call router communicate with the module at a Universal Resource Identifiers (URI). The module is preferably stored on an application server but the module may alternatively be stored in any suitable location. Modules preferably have a specified initial URI (i.e., a module inlet). The URI may be a resource indicator for Hypertext Transfer Protocol (HTTP), Session Initiation Protocol (SIP) or any suitable communication protocol. In the case of specifying a SIP address, the module may include using a basic communication routing server to facilitate communication with the specified SIP address. As described more below, the initial URI may additionally be used to pass operation parameters to the module. In some variations, the operation parameters may be information to determine what module will be passed application control. In this variation, a single URI can be used to define the application configuration for a plurality of modules.

Figure 4:
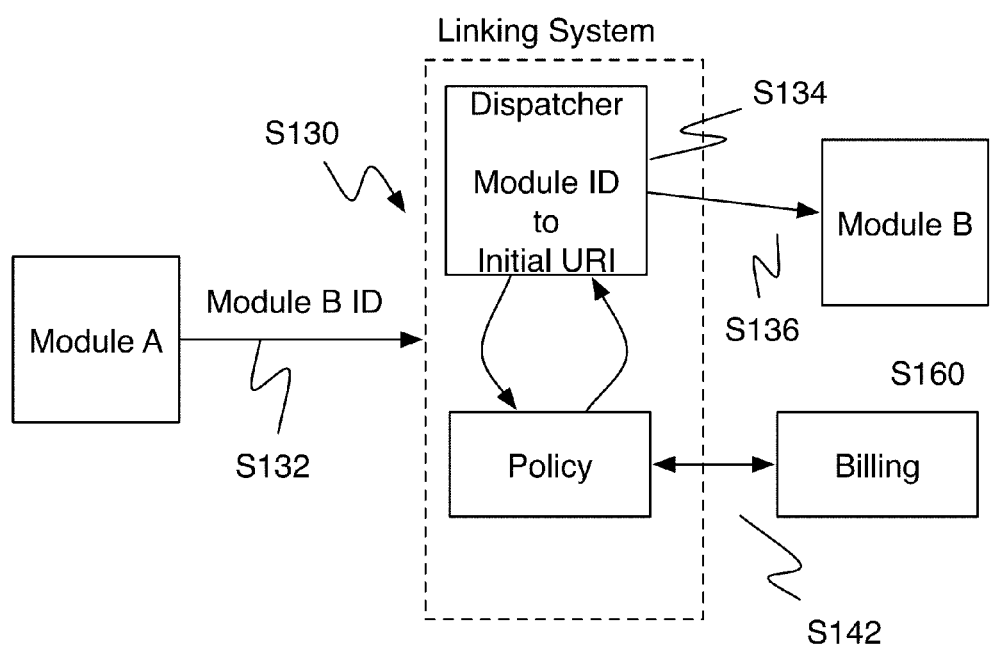
FIG. 4 is a schematic representation of a preferred linking system.

Step S130, which includes passing application control from the first module to a second module of the account through a linking system, functions to transfer the application control as viewed by the telephony platform to a second module. Passing application control from the first module to a second module can include receiving a module identity code of the second module, wherein the module identity code is received during communication control of the first module. The module identity code can be received from the first module or initiated from an outside entity (e.g., an API request). The module identity code can direct communication control of the communication session/application to a different specified module. The passing of application control is preferably initiated through programmatic logic of the first module such as entering an operational state or some action. The operational state can include executing a particular type of command such as a type of application instruction or a redirection to a module identifier. For example, executing a dial command can trigger transitioning to a routing application module. Similarly, an action can be triggered by an API call directed at the communication session/application (as can be specified by a session identifier). Transitioning is preferably seamless and can include performing media channel invites to appropriate resources of the new module. This module state or action can be thought of an outlet. There may be a plurality of outlets of which application control may be passed to varying modules. As an example, a phone tree module may have the actions of various dual-tone multi-frequency (DTMF) (or alternatively speech recognition phrases) assigned to different modules that will be passed control if that action is taken. As discussed above, the first and second module may be operated by any suitable party, and the second module preferably does not need to have any knowledge of the first module to be passed control. Operation of the first module is additionally independent of the second module, except that the mechanism of the linking system may require being implemented by the first module. The linking system may be operated in a number of ways. In a first variation, the linking system includes performing a URI redirect to the initial URI of the second module. For example, the first module will issue a command to the telephony platform to next communicate with the initial URI of the second module instead of a URI of the first module. The redirect URI (e.g., the initial URI of the second module) may be stored by the first module. The URI redirect may alternatively be preloaded through the initial URI of the first module. So one initial URI may include all the application logic to use a plurality of modules by embedding the application configuration parameters in the initial URI of the first module. As a second variation shown in FIG. 4, the linking system may include using a dispatcher engine that performs the steps of passing a module identity code of the second module to a dispatcher engine of the telephony platform S132; converting the code to a URI for the second module S134; and directing call control to the second module at the URI for the second module S136. The module identity code is any suitable representation of the second module. Each module usable by the telephony platform is preferably assigned a module identity code. The dispatcher engine is preferably a service run on the telephony platform that maps module identity codes to initial URI's of modules. The module identity codes functions to allow the location of the module to be aliased so that a developer may change the location and setup of a module without breaking links to an initial URI that other modules include. The dispatcher engine may additionally provide a level of security such that use of a module may not be achieved if it is not allowed. As yet another variation, the dispatching engine may store module-to-module flows in an application configuration datastore (i.e., a container app), and the first module preferably signals that the next module (or module of a particular outlet) should be transferred control. In this variation, the first module may not have knowledge of what module is being linked to. The application configuration datastore preferably includes aliasing of the initial URI's of modules and will direct application control to appropriate initial URI. In an alternative variation, the dispatcher engine and linking system include a set of instruction primitives to signal when to change application state between modules. The dispatcher engine can function to facilitate to transferring control of a communication session (i.e., application state) between resources of the communication platform. As described below resource switching can be used to enable dynamic platform stack utilization. In one implementation, a communication session can be switched between at least three operational modes/modules including: a basic resource mode (e.g., basic routing and communication facilitation), an application primitive mode (e.g., customized application logic execution), and an application service mode (e.g., use of provided application logic for particular use cases). The dispatching engine preferably additionally works in cooperation with a policy engine that determines if application control is allowed and/or a billing engine that uses a designated usage model for billing management of various parties as shown in FIG. 4. The policy engine and the billing engine are discussed below. The dispatcher engine and the policy engine preferably cooperate to determine where application control should be directed and if application control should be allowed for the particular user account. The billing engine is preferably used in combination with the policy engine to determine billing factors that would prevent module access.

Step S140, which includes metering use of the first module and the at least second module, functions to account for the different modules of the application separately. The first and second module usage of the telephony application for a user account is preferably individually metered. The independent metering can preferably be achieved because use of the telephony platform during application control by each module is preferably isolated and accountable. A history of module control for a given communication session can be recorded. That history can be made accessible by querying for module control history for one or more communication session. The telephony platform (e.g., a call router) can preferably track what module URI's are being used for application control, and more preferably the dispatching engine or the policy engine preferably tracks application control. In addition to metering application control, actions outside of application control (asynchronous usage) may be monitored. For example, API calls made by a module or other use of the telephony platform that do not relate to an instance of application control may be included in the metered activity. The metered activity can measure usage in different operational modes by detecting switching outside applications or switching resources used to control application state of a communication session. Metering preferably includes maintaining usage statistics. The metrics used for metering can include per "period use" (e.g., unlimited usage for one month), amount of usage in a fixed period (e.g., 100 minutes of call time per month or 500 text messages in a month), or a usage limit (e.g., 500 text messages), or any suitable usage model. Alternatively, the metering may include noting that a module is in use during a particular period. This may be used for a usage model with unlimited use in a time period. In a variation where the method is applied to dynamically changing operating mode within a platform stack, the method can include metering basic resource usage, application primitive execution, and/or specific application services separately to bill at a flexible rate that is substantially proportional to the value-added to the communication session. For example, when the communication platform is providing basic routing, the billing rate is lower than the billing rate when an application is being actively processed during a communication session. Preferably the comparison of time period of unlimited use and the current time is used in verifying permission for the account to use a module. For example, if a usage model is set so that the module may see unlimited use during month period, the metering preferably notes that the month is being used in a particular month, and a policy engine preferably verifies permission for an account to be used that month (e.g., check if the current date is included in the month of unlimited use). This particular alternative may be further used during the configuration of telephony application. A particular module may not be prevented from being configured within a telephony application until the current time period is paid for. The metric used to measure usage of the first module and the second module can preferably differ, such that the usage model of each module may be individually assigned.

Figure 5:
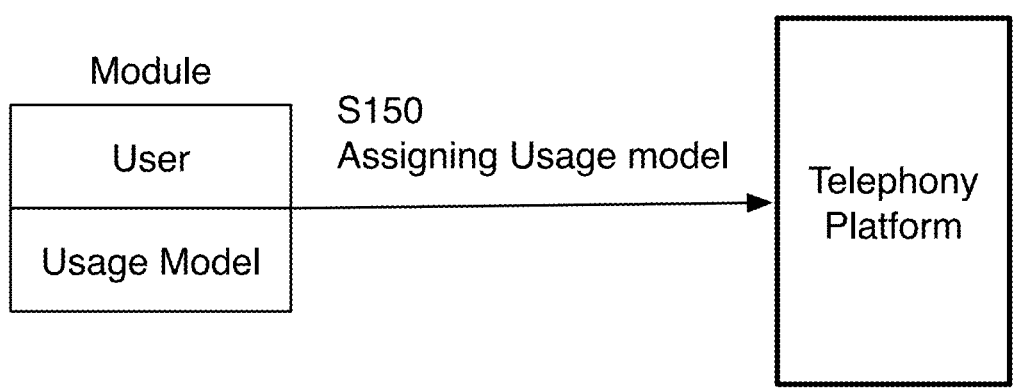
FIGS. 5 and 6 are schematic representations of assigning a usage model.
Figure 6:
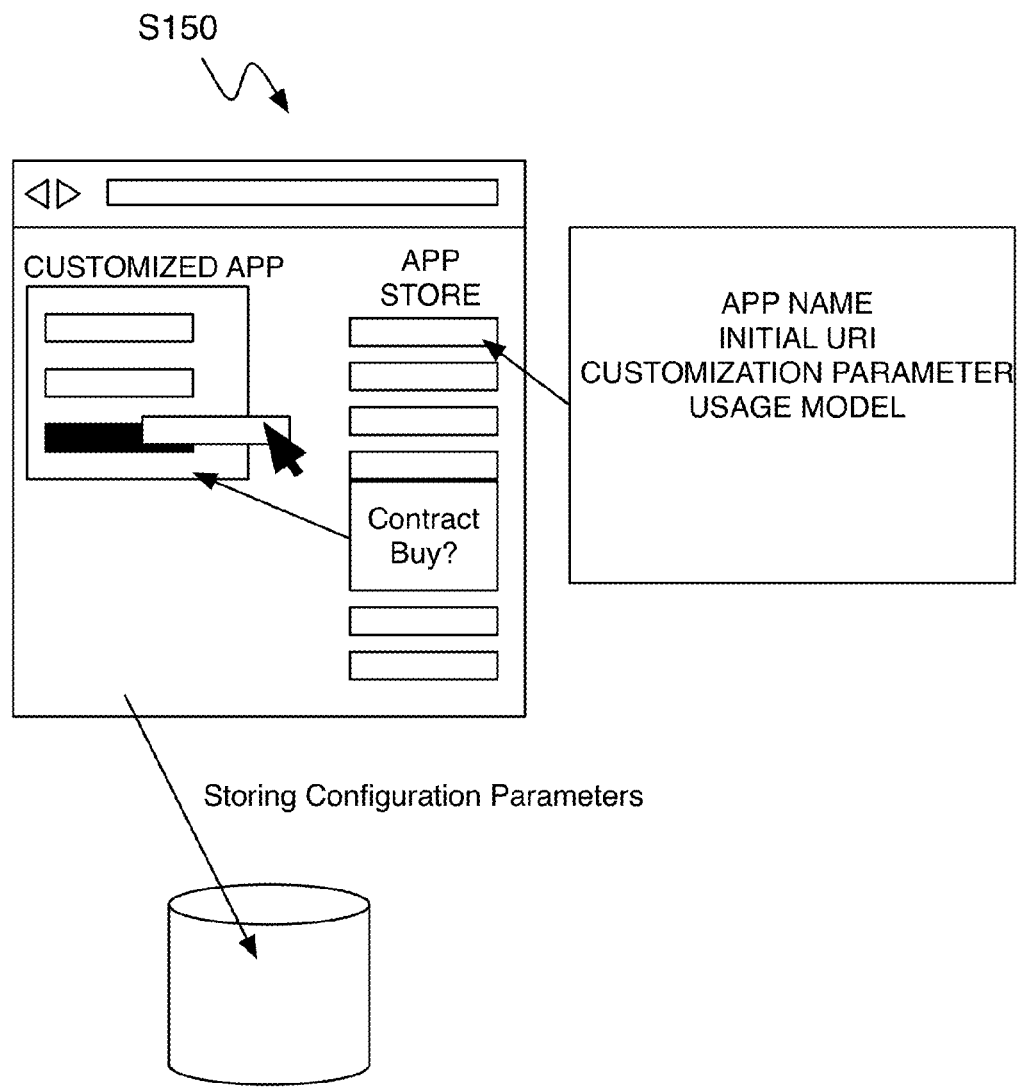

As an additional step of the preferred embodiment shown in FIGS. 5 and 6, the method S100 may include assigning a usage model of the account for the first module and the second module S150, and prior to directing application control to the initial URI of the second module, a policy engine verifying permission for the account to use the second module S142. The usage model of a module is preferably assigned during a prior configuration of the application and the information is stored for the application of the account. The usage model may be an agreement of what resources can and cannot be used but preferably includes a billing agreement that specifies a pricing model for the use of the module. When verifying permission, the policy engine is preferably checking that the users usage model is being followed. Conditions for permission may include having a fully paid account, having current billing information, having funds in an account, or any suitable condition. Other permission rules may additionally be included such as categorization of user, banned user lists or any suitable permission setting. In some cases the policy engine may need to communicate with the billing engine to obtain information pertinent to the rules for permitting usage. The policy engine is preferably used when the linking system is being used when passing of application control is made between two modules. The policy engine and the dispatcher engine may be used in any suitable order or configuration.

Figure 7:
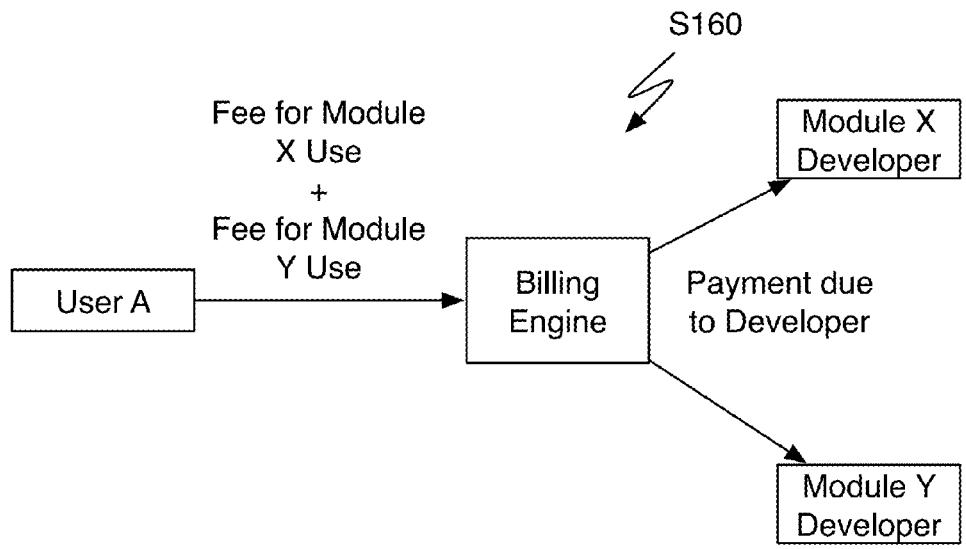
FIGS. 7 and 8 are schematic representations of transferring payment.
Figure 8:
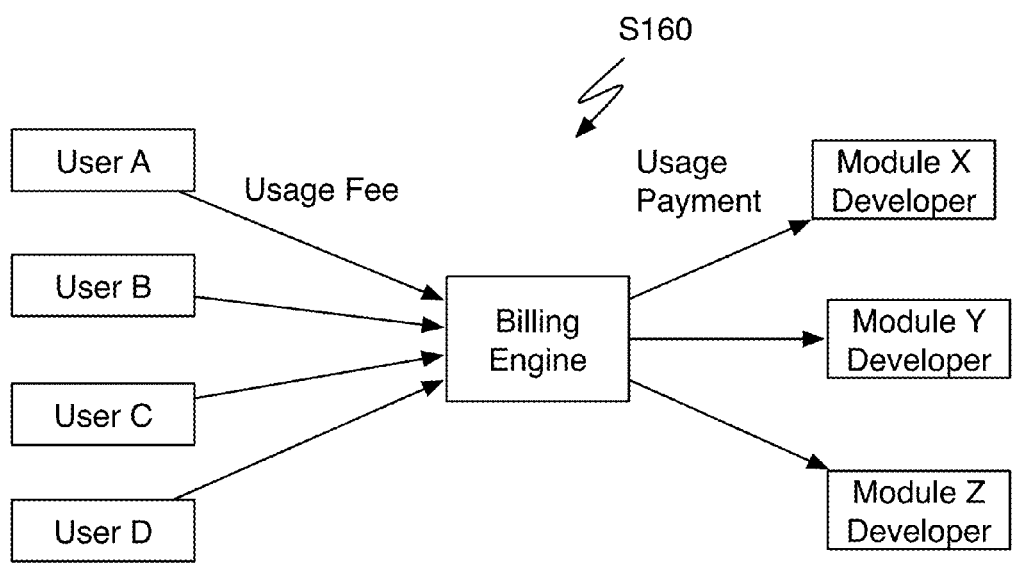

As an additional step of the preferred embodiment, the method S100 may include a billing engine that performs the steps including transferring payment from an account based on a usage model for the first module and the second module S160, which functions to charge accounts and/or pay entities based on independent usage models and metered usage by a first module and at least second module. The billing engine preferably provides a simplified billing process for applications composed of multiple modules. A user account may enter numerous subscriptions/contracts with different entities when using an application with a plurality of modules, but the billing engine is preferably used to consolidate the different usage models so that the user pays a single bill for all module use as shown in FIG. 7. Similarly, developers, owners, or any entity associated with the module has simplified billing procedure by preferably having the cost of telephony platform use and payment from a plurality of user accounts consolidated into a single payment as shown in FIG. 8. Preferably, transferring of payment from an account includes charging the user account for combined usage of the first module and the at least second module as indicated by the metered use of the first module and at least second module and distributing payment to an entity of the first module based on usage record of the first module and distributing payment to an entity of the second module based on a usage record of the second module. When distributing payment to an entity of a module, there may be some portion of payment that the telephony platform receives, and thus the payment delivered may factor in this cost. This preferably enables the telephony platform provider to act as a single point of billing even though each user may have numerous contracts with different module operators. The user account instead of paying numerous bills each with possibly different usage plans, pays just the telephony platform provider, and the developers. Similarly, operators of the modules receive a payment from the telephony platform instead of developing their own infrastructure to track usage of the module and also implementing their own billing system. Additionally, the billing engine preferably cooperates with the policy engine so that the policy engine may verify the user account has satisfied the billing requirements. These billing requirements may be for the overall application but may be for each module individually. In one variation, a single entity is associated with the first, second, and additional modules. For example, the modules may be different operation modes within the communication platform, and the platform provider may be a single recipient of payment. Alternatively, an outside entity could provide at least one component of either communication resources or an application service in which case two or more entities can be recipient of appropriate payment.

As previously discussed, the method may include sharing state information of the first and the at least second module S170. Each module can preferably have individual configuration parameters, which may be stored by the module operators, on the telephony platform, or through any suitable device. The configuration parameters combine to form a configuration state. Additionally, the application as defined by the collection of modules may have configuration parameters. The application configuration parameters may be the flow of the modules in the application, but may alternatively be variables that are globally available to the modules of the application. For example, an account ID, a call number, text message, and/or any suitable parameter may be available to the modules. The configuration parameters in one variation are passed through the initial URI's of the modules that is used when passing application control. For example, settings for a simultaneous ring app may have two phone numbers, 415-555-1234 and 415-555-6789. Rather than storing and accessing these settings from a database the applet reference may have them embedded in the reference such as:

http://twimlets.com/simulring?PhoneNumbers[o]=415-555-1234&PhoneNumbers[1]=415-555-6789&.

As another variation, the parameters may be accessible through an API call to the telephony platform where the configuration parameters are stored. A pre-assigned key value pairing may be provided for use by the modules. In a variation where multiple instances of the same module are used, settings may be setup globally for all instances or saved individually for each instance of a module. Settings and information that may be collected may include phone numbers, email addresses, sound files, text (to read with a text-to-speech service), URI's to other media, other module references (initial URI's), or any suitable inputs. In addition to configuration parameters that may be set for every application use, instance parameters (i.e., parameters that are unique for every phone call or text message or application use) may additionally be shared through similar techniques. After application control has been passed to the second module, then telephony platform requests are preferably sent to a URI of the second module.

Additionally, the telephony platform may include a notification engine that preferably performs the step of notifying a module of activity on the telephony platform. The notification engine preferably sends an event notification during any suitable event. Such events may include an incoming call to an application, an end to an application instance, a billing event, or any suitable event.

2. A Method for Providing Metered API Access

Figure 11:
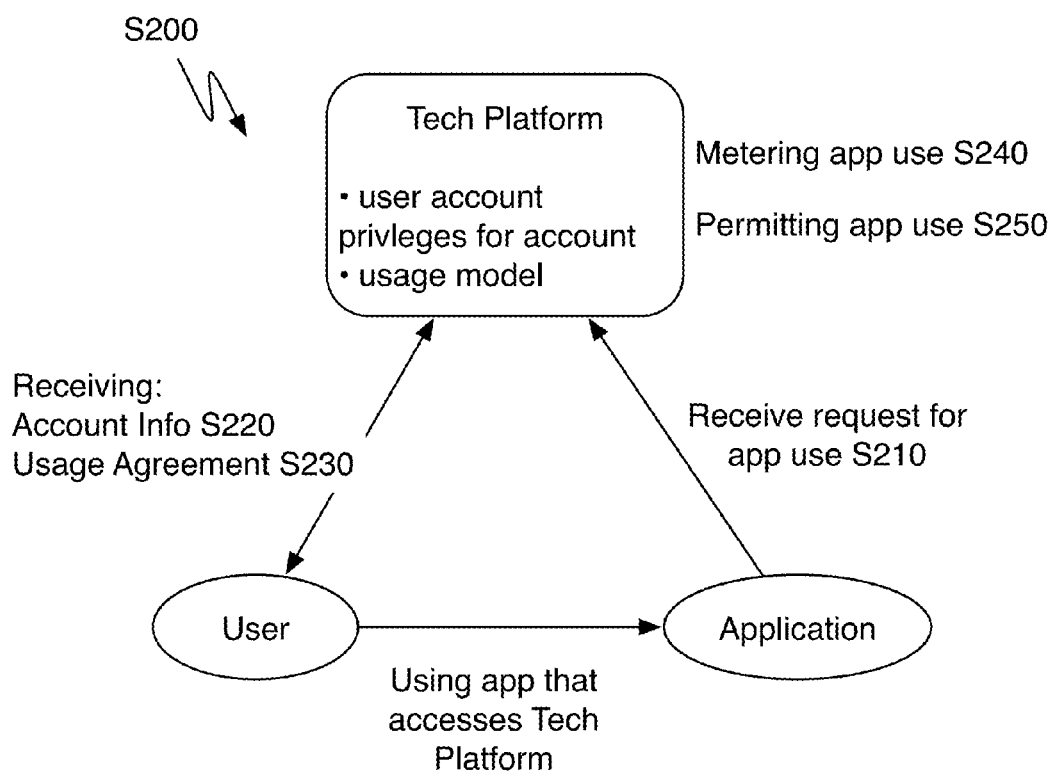
FIG. 11 is a schematic representation of a second preferred embodiment of providing metered API access.

As shown in FIG. 11, a method S200 for providing metered API access of a second preferred embodiment preferably includes receiving a request to add an application for use on a platform S210, receiving user account information for the platform S220, receiving usage agreement information for the user account S230, metering the application usage for the account S240, and permitting use of a platform resource for the user account according to the metered usage and usage agreement S250. The method S200 preferably functions to enable a single application to be used by users of a usage based technology platform. The technology platform may be any paid platform such as an API (a REST API, SOAP API or any suitable API) or may alternatively have usage limits. More preferably, the technology platform is a paid or usage based platform where usage of the technology platform either by the user or of the application is of importance to the services provided. There may be usage limitations or alternatively billing requirements based on usage. Method S200 can preferably by used with the method S100 above for the modules of an application, and method S200 may additionally be used for a telephony platform, and used in a manner substantially similar to the method S100. But the method S200 can preferably be used with standalone applications such as a third party mobile app that uses a web service. For example a social network that wants to charge for third party mobile phone application access to the social network API could use method S200. The method S200 can preferably be performed by a system as in the above method that includes a policy engine, a billing engine, and/or a dispatcher engine. The method S200 may additionally be extended for use with a plurality of applications or resources used in association with a user account, where the user is accountable for different usage models of each application or mode of resource use, as in the method S100.

Steps S210, S220, and S230, which include receiving a request to add an application for use on a platform, receiving user account information for the platform and, receiving usage agreement information for the user account, functions to authorize an application to access resources of an account and provide suitable usage metering. This process can be setup similar to other authorization processes such as oauth. However, the process additionally includes receiving usage agreement information. The usage agreement information may be a variety of items depending on the particular technology platform. Preferably, the usage agreement information includes billing information and an agreed upon usage plan. The usage plan may be a fee per time period, a fee per amount of resource use, fee per amount of time, or any suitable usage model. In another variation, the usage agreement information may be an acknowledgement to the amount of use available to the user, such as a limit of data usage per time period. The Steps S210, S220, and S230 preferably result in an application receiving access to account resources on the technology platform and a usage model being setup for the user account of the application.

Step S240, which includes metering the application usage for the account, functions to create a record of the usage of the application by the user account. The metering is preferably substantially similar to the metering as performed in method S100. Metering of application usage may additionally be targeted to particular actions such as the number of times an API call is made or used during a particular time period. The technology platform preferably meters the activity by the application.

Step S250, which includes permitting use of a platform resource for the user account according to the metered usage and usage agreement, functions to regulate the use of the application by the user. A policy engine substantially similar to the one described above is preferably used for this step. The policy engine may additionally communicate with a billing engine to determine permission. In the method S100 above, this step preferably includes passing application control to a module (or application). In other alternatives, the permitting use of a platform may include allowing specific API calls or resources to be used by an application. Depending on the usage agreement information this may be limited to specific API calls or be overall access to the technology platform. When permission is not allowed, any suitable error message or action may be taken. Depending on the usage agreement, when access is not allowed because usage has reached a limit of the plan, a billing engine may automatically charge a user account to enable uninterrupted use of the technology platform. A billing engine may additionally perform steps substantially similar to the billing steps of method S100. The platform preferably collects payment from a user account and then distributes payment to the entity associated with the application (e.g., the developer). Users that utilize multiple applications on a technology platform can preferably receive a single bill, and developers of applications can similarly receive a consolidated payment for all users delivered by the telephony platform.

3. System for Customized Telephony Applications

Figure 12:
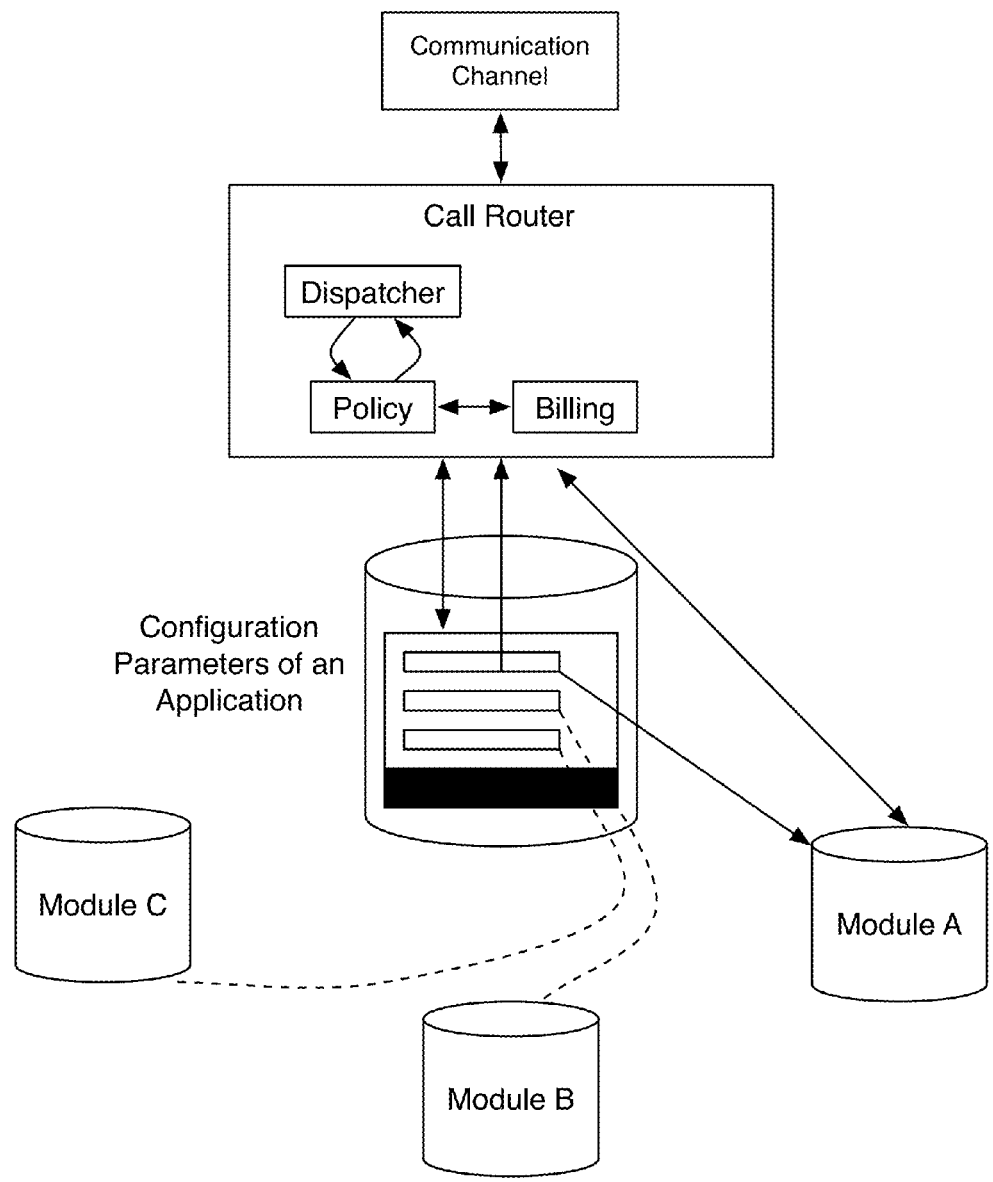
FIG. 12 is a schematic representation of a system of a preferred embodiment

As shown in FIG. 12, a particular system for performing the above methods preferably includes a telephony platform with a linking system and a plurality of modules. The linking system preferably includes a dispatcher engine, a policy engine and a billing engine, but may contain any alternative combination or alternative components. The dispatcher engine preferably works to determine what initial URI to pass application control. The policy engine preferably enforces permissions and can communicate with the billing engine to determine billing related restrictions.

The system is preferably implemented to enable multiple applications provided by different entities to be integrated into application state control of communication sessions. Additionally or alternatively, the system can be used to enable the state control of the communication session to transition between different modules of a platform. modules can describe different layers, components, or abstraction levels of interacting with communication sessions (e.g., low level components, application instructions, customized service logic). As the communication session is handled by different modules, resources of the communication platform, and/or outside resources, the usage can be tracked and independently metered. The metered usage can then be used to adjust billing or other accounting objectives. It can also be used to alleviate operational load from higher level modules if the communication is feasibly managed at a lower level module. The communication platform preferably includes basic communication resources, a set of application processing resources, and optionally specific application service logic resources.

The basic communication resources of a basic module function to provide singular or limited communication control functionality. The basic communication resources can be a call bridge that connects two or more telephony endpoints. The basic communication resource can similarly be a SIP service used to connect to one or more SIP endpoints or other suitable IP-based communication endpoints. A basic communication resource is preferably characterized as an individual server or service that can sustain a synchronous communication session. The basic communication resource can passively facilitate a communication session in that an origin endpoint and at least a destination endpoint are the active participants and the basic communication resource simply provides basic communication channeling. A communication session can be routed to only use a basic communication resource and in effect reduce the resource usage within the communication platform—a full set of application processing resources are not dedicated or used when routing a communication session through the basic communication resource. The basic communication resource preferably includes at least an API. The API can be used to externally signal that a communication session should be rerouted and transferred to another module and/or resources of the communication platform. The basic communication resource may alternatively include other mechanisms such as an event callback mechanism such that the communication session can by automatically rerouted to another module or resource when an event is detected. For example, a call-end callback parameter can be stored for a communication session, and when one of the legs of a communication session ends, the communication session is rerouted according to the stored call-end callback parameter. The call-end callback parameter can be similar to mapping of an incoming call. The parameter may be a destination endpoint, an external application URI to use with the set of application processing resources, an application identifier, or a service identifier as described below. A communication identifier is maintained to enable an API call to reference the communication sessions to update. A communication session can alternatively transition to a different operational mode from the basic communication resource with any suitable mechanism.

The set of application processing resources of an instruction-processing level module functions to enable dynamic changes during a communication session. A communication session will preferably be controlled by an instruction-processing module and managed by the set of application processing resources during customized application logic of the call. A developer will preferably use the application processing resources to provide customized logic and integration with their own application/platform. The application processing resources preferably includes a set of various resources (e.g., application processing call routers, message routers, text-to-speech engines, call queues, media services, recording services, speech recognition engines, input detection like DTMF detection, and other suitable resources. The application processing resources preferably receive direction from at least one set of telephony instructions retrieved from a URI. The telephony/communication instructions can alternatively be retrieved from any suitable location. More preferably, the application processing resources act in a request and response type communication mode with outside application servers. The application processing resources have a set of platform instruction primitives from which various application logic can be constructed and directed by provided telephony instructions. The platform instruction primitives can include a say verb (e.g., TTS of provided text), play verb (e.g., play an audio, video, or media file), gather verb (e.g., collect DTMF input), record verb (e.g., record audio or video from one or more endpoints in the communication session), message verb (e.g., send an asynchronous message), dial verb (e.g., connect to phone number, a SIP address, IP based client device, a conference call, or to an endpoint in a queue). Additional platform instruction primitives can include an enqueue verb (e.g., add a communication session to a queue), leave verb, hangup verb, redirect verb (e.g., retrieve telephony instructions from a different URI), reject, or pause verb. The dial verb in one instance can be used to transition the operating mode to the basic communication resources. For example, a dial command specifying a SIP address will transition the communication session to a SIP bridge server that bridges the caller with the device of the specified SIP address. The set of application processing resources also have API access with which the operational mode of the communication session can be changed. The communication session can again be referenced in an API call through a communication session identifier.

The call router functions to initiate or receive calls from a telephony device and to connect to a deployed container app and/or applet. The call router is preferably connected to a Public Switched Telephone Network (PSTN) device over the PSTN network, such that the call router can receive and make calls from PSTN-connected devices 21, such as landlines, cellular phones, satellite phones, or any other suitable PSTN-connected devices, as well as non-PSTN devices, such as Voice-Over-Internet-Protocol (VOIP) phones, SIP devices, Skype, Gtalk, or other Internet addressable voice devices or client applications. The call router may alternatively or additionally function as or include a message router for use with short message service (SMS) messages. The call router can preferably connect to an SMS network, such that it can receive and send messages from SMS network devices, cellular phones, computers, smartphones, or any suitable SMS network devices. The call router may also send or receive text messages, multimedia messages, emails, faxes and other suitable PSTN-compatible communication messages. The call router preferably communicates with the application or modules using an application layer protocol, more preferably using the HTTP, or secure HTTPS, protocol. SIP or any suitable internet protocol may alternatively be used. The communication between the module and the call router is preferably stateless and any state information (e.g., call state) or data is preferably located in a URI or the request parameters, such as HTTP headers, GET URI parameters, POST request body parameters, HTTP cookies, or in configuration parameters of the application or module. The call router will preferably request initial communication instructions and/or media from an initial URI using HTTP/HTTPS, SPDY, or any suitable application layer protocol. If the application server of the initial URI returns a document with communication instructions, the instructions can be sequentially processed and executed during the communication session. After completing processing, in response to an event of one of the communication instructions, or in response to a received API instruction the call router makes a subsequent request to a URI. The URI can be the same URI as the initial URI but may alternatively be a new URI specified in the triggering instruction or API request. In some cases the application logic of a module will redirect the application to a second module through an identifier. Similarly, the operational mode used to manage the communication session can change to transition between different resources of a platform. The call router 140 preferably stores state information in call router resources. The call router resources are preferably accessible by the application server and other devices through a call router API. The call router preferably associates each incoming phone number with a starting URI, The starting URI is preferably the location of the application or the initial module. Before a call is received at the call router, the starting URI is associated with the incoming call address (such as DID, SIP address, etc.) or by the application upon initiation of an outgoing call. The call router can preferably send call data such as the caller number (obtained via Caller ID), caller geographic data (country, city, and/or state, zip) the number dialed, the time of the call, or any other suitable information or parameter.

The module is preferably includes at least one set of application logic that instructs control of a communication session. The application logic can be defined in a resource such as document containing telephony instructions interpreted by the call router. The instructions are preferably translated into actions and handling of the telephone call, text message or other telephony communication. A module may provide any suitable functionality. Some exemplary modules may include a store locator, an e-commerce order status app, call analytics, a find-me application, an RSS feed powered app, a call directory and routing app, an advertising application that calls another applet reference after playing an advertisement, a voicemail app, menu app, a simultaneous call app, a find me app that calls a list of numbers until one of them is answered, or any suitable application. Developer modules can be remotely hosted at a site selected by the developer utilizing any suitable architecture, yet the modules can be made available in a single marketplace to provide better exposure, and lower the barrier of acceptance by potential customers. The modules can similarly be internal modules provided within the communication platform. Some modules are user/account selected, while other can be dynamically or automatically invoked on behalf of a user (such as a routing module).

A service module functions to provide a targeted set of functionality built on top of the platform. The application service logic resources of the service module can be characterized as a higher stack layer. Use of the service module can be more accessible and easier to setup and use for a specific use case when compared to customized application logic of the application processing resources. The application service logic resources preferably operate on top of the underlying application processing resource and/or the basic communication resources. The application service logic resources, however, provide application logic. The application logic is preferably geared to generic use cases or "verticals" of the communication platform. Multiple application services can additionally be provided. The application services can include a call center service, a phone tree service, a verification code service (e.g., for two-factor authentication, coupon redemption, etc.), calling card service, a survey service, and the like. The service module can be used in any suitable manner. In one variation, the service module can provide customized instruction primitives with which the use of the application service can be customized. In another variation, the application service operates according to a configuration file. The customization mechanisms of the service module can provide avenues to trigger changing the operational mode of the communication session such as by redirecting to an external communication application that would operate on the application processing resources or by redirecting the communication session to a communication endpoint such that a basic communication resource takes control of the state of the communication session. In a manner similar to above, an API can alternatively be used to trigger transitioning between modules and/or stack layers.

The system may additionally include a billing engine that functions to manage and track telephony platform usage by a module to appropriately charge a user. The billing engine preferably tracks all modules according to set billing policies agreed to by a customer in a usage model. This may include tracking time of use, number of uses, or according to any suitable subscription model. The billing engine preferably consolidates all module fees for both the customers and the developers. It is envisioned that a customer may have multiple service agreements and contracts for various modules. The bills for the various modules are preferably consolidated into a single, periodic bill created and sent out by the billing engine. Similarly, it is envisioned that a developer may have a plurality of customers with varying agreements. The payments from the various customers are preferably consolidated into a single, periodic payment. Account information and billing information is preferably stored in any suitable database.

4. Method for Servicing a Communication Session in a Multi-Layered Platform

Figure 13:
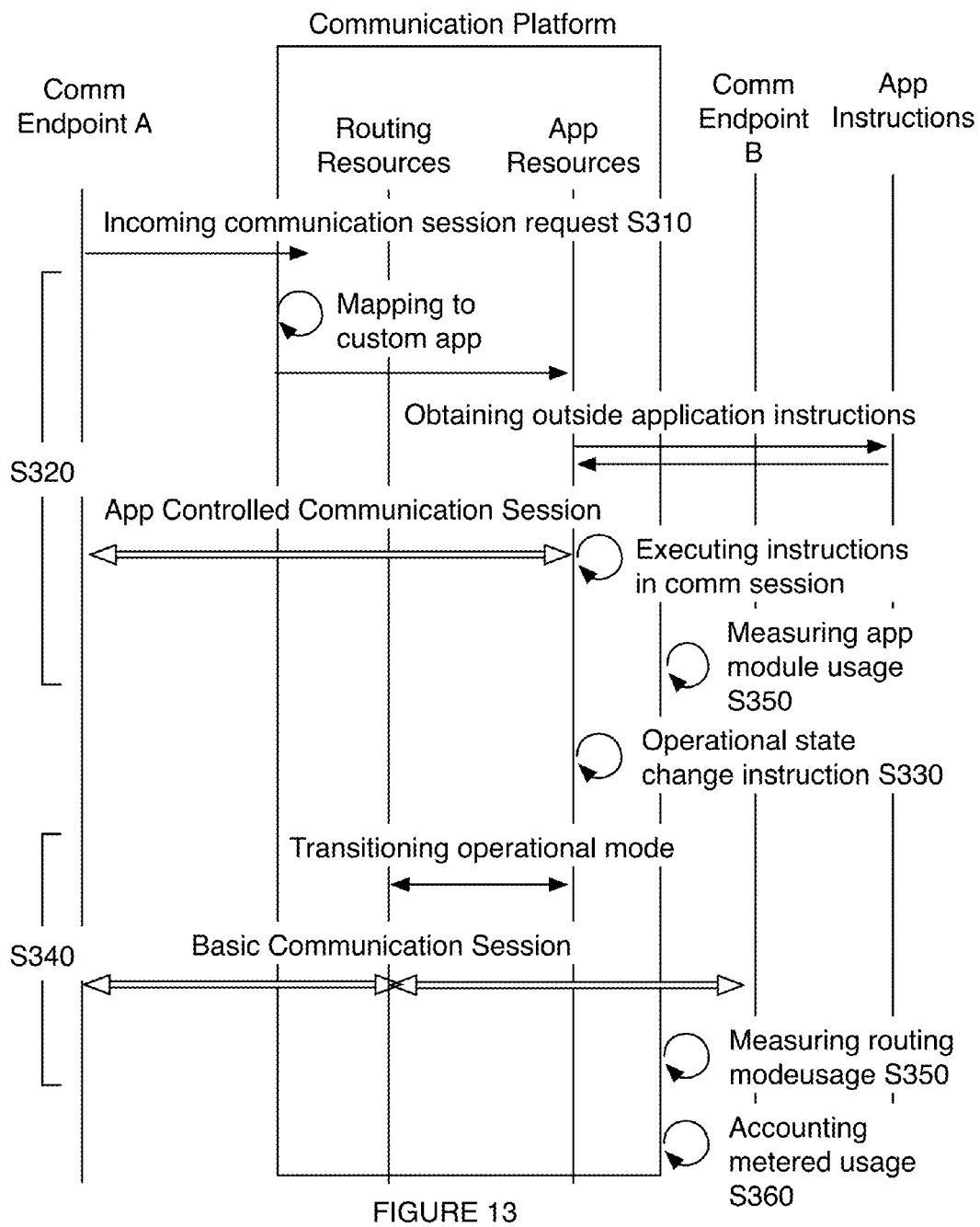
FIGS. 13 and 14 are communication flow diagrams of a method of a preferred embodiment.
Figure 14:
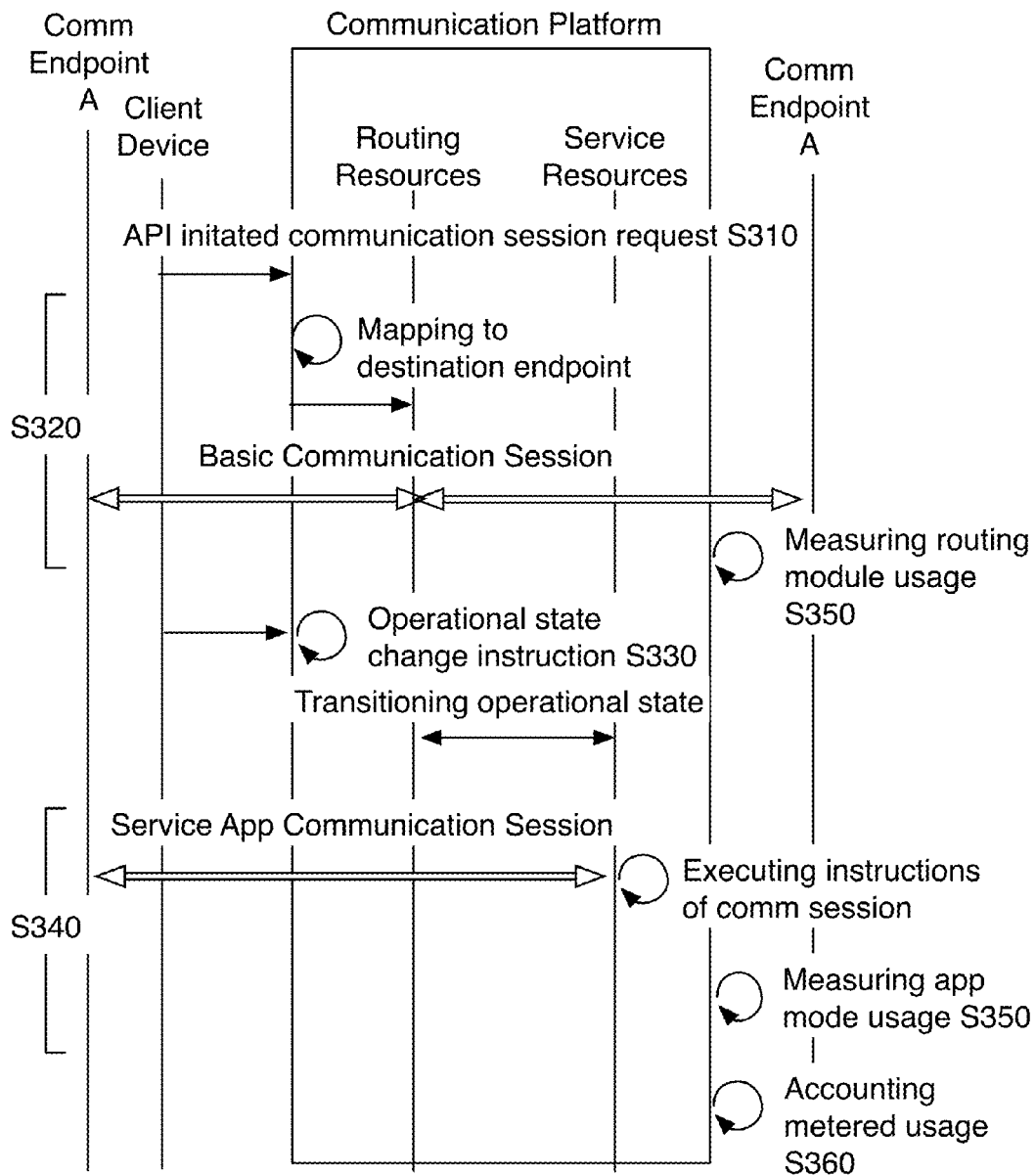

As shown in FIGS. 13 and 14, a method for servicing a communication session in multi-layered communication platform of a preferred embodiment includes receiving a communication session request specifying a destination endpoint S310, connecting the communication session through a first application module according to the destination endpoint S320, receiving an instruction to transition communication control to a second application module S330, transitioning communication control of the communication session to the second application module S340, independently metering resource usage of the communication session of each application module S350, and accounting the metered usage of the communication session S360. The method functions to enable dynamic application stack utilization during a communication session. The method is preferably used for a bi-directional communication platform that enables a developer to run an application that acts on or during communication sessions. The method can be applied to synchronous and asynchronous communication platforms or platforms enabling a mixture of synchronous and asynchronous communications. The different modules can be used for different operational modes during a communication session. The method separately tracks usage within the application modules, and generating an aggregate account or record of resource usage during a communication session. More preferably, the method uses the combined resource usage to calculate a billing report dependent on the modes of operation.

Figure 15:
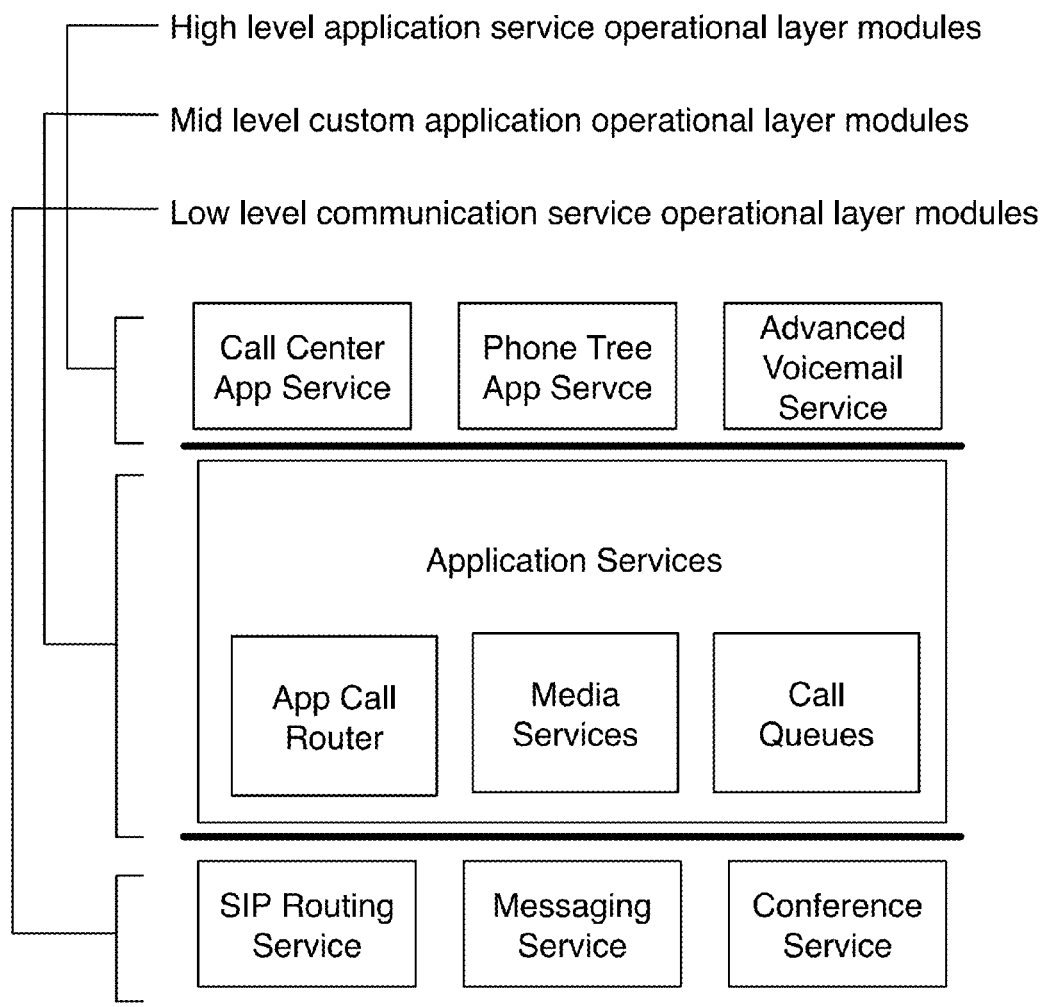
FIG. 15 is a schematic representation of a resources different layers of a communication platform.

The method enables applications operating within a platform to selectively or automatically change the mode of session operation/management to an alternative mode that better targets the current requirements of the application state of the communication session. Different modules can have different application logic and/or resources that enable different operating capabilities, performance, and/or functionality. The method can be used to switch between different modules of outside developers but the method is more preferably applied to changing internal modules that manage a communication session within a communication session. A communication session can be transitioned between different modules that are operating at different platform stack abstraction layers. A lower layer module can provide simple resource functionality usually communication routing and bridging; a middle layer module uses more resources to process customized application logic during a communication session; and a higher layer module can provide business logic of a service built on top of the resources of the platform as shown in FIG. 15. In a low level module, an application may only require the platform to bridge two endpoints and possibly provide a mechanism to change the operating mode and/or track events. In a middle level module, an application may need a set of instruction primitives to build customized application logic. In a high level module, an application may want to provide commonly performed application logic provided by an internal service or an external application module. The method can be employed for any sequence of mode transitions such as transitioning from a high operational module to a low operational module as shown in FIG. 13 or transitioning from a low operational mode to a high operational mode as shown in FIG. 14. The modules can provide any set of resources or communication control logic and the description of low, middle, and high level modules are used to describe a preferred embodiment but in no way limits the invention to such modules or combination of modules. The method can include any suitable number and variations of types of application modules.

Figures 17A, 17B:
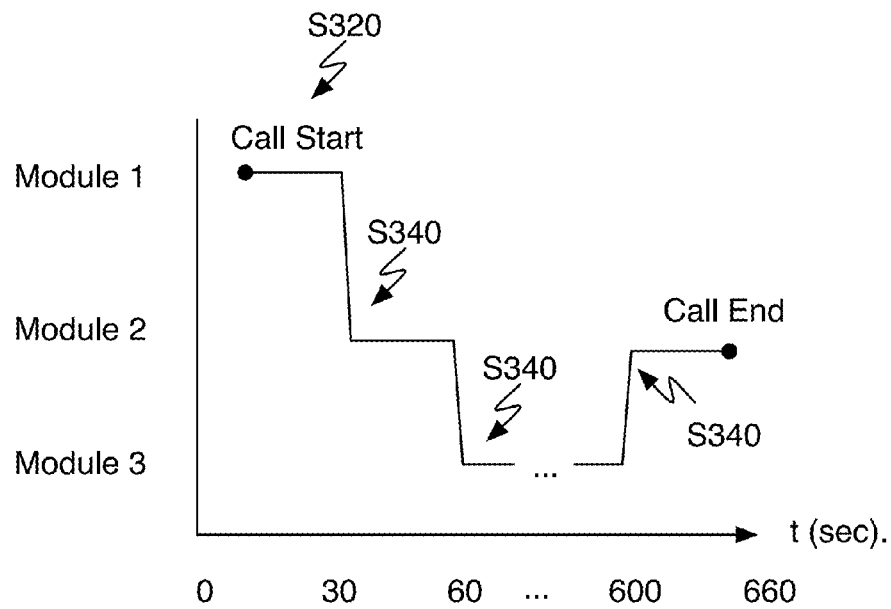
FIGS. 17A and 17B are representations of metered usage and accounting of usage for an exemplary communication session.

The method preferably allows a communication session to take any suitable path between different sets of application modules. A communication session can transition from a lower level module to a medium or high level module. A middle level module can transition up to a high level module or down to a low level module. A high level module can transition down to a middle level or a low level module. In some implementations, a transition can be made laterally to modules within the same layer. For example, a SIP routing module can transition to a conferencing module. As shown in FIG. 17A, the changes between modules can occur with dynamic timing and be selectively invoked according to business logic of the application or outside triggers. The method preferably benefits the communication platform by providing a wide variety of possible services while conserving resources dedicated to a communication session. The method additionally can have the benefit of allowing customers to take advantage of higher level functionality when appropriate and lower cost transactions when the functionality is not needed.

Step S310, which includes receiving a communication session request specifying a destination endpoint, functions to initiate communication platform at least partial control of a communication session. The communication session request can be or be triggered in response to an incoming communication (e.g., phone call, IP based voice, video call, multi-media messaging chat request). The communication request can alternatively be in response to a programmatically triggered request to make an outgoing call. The programmatically triggered request is preferably made on behalf of an account of the communication platform and preferably made through an API of the communication platform (e.g., a REST API). Outbound communications (i.e., a communication originating with an endpoint associated with the account and directed at an outside endpoint) can be established through the API initiated communication session request. The communication session is preferably a request to establish a synchronous communication session such as a telephony session (e.g., over PSTN or SIP), a voice call, a video call, mixed protocol session (e.g., one leg connected to a PSTN based telephony device and another leg a video call to a client application), a screen sharing session, a bi-directional messaging conversation (e.g., text, image, or multimedia messaging), or any suitable b-directional session. The communication session request includes at least a destination endpoint address. The destination address. In an inbound request variation, the destination address is associated with an account of the communication platform. In an outbound request variation, the request is made on behalf of an account of the communication platform, and the outbound request can additionally be made on behalf of an originating endpoint address that is associated with the account. The account association can be used in Step S320 to initially determine how to initially manage a session.

Step S320, which includes connecting the communication session through a first application module according to the destination endpoint, functions to connect a communication session in a first operating mode. As described above, the communication platform can include at least two operating modes or modules, and a preferred implementation includes at least a modules: a mode for basic communication facilitation, a mode for customized application processing, and a mode for provided application logic for a particular use-case of the communication platform. In an exemplary implementation, a low level module provides low-level bridging functionality, a middle level module includes resources to dynamically control state of a communication session, and a high level module provides a general service on top of the platform. Examples of a service on top of the platform can include a call center service, a phone tree service, a verification code service (e.g., for two-factor authentication, coupon redemption, etc.), calling card service, a survey service, and the like. The different modules preferably include different sets of platform resources and/or sets of application logic. A communication session can start with any of the provided operating modes depending on the configuration of the account, endpoint, and/or parameters of the communication request.

Figure 16:
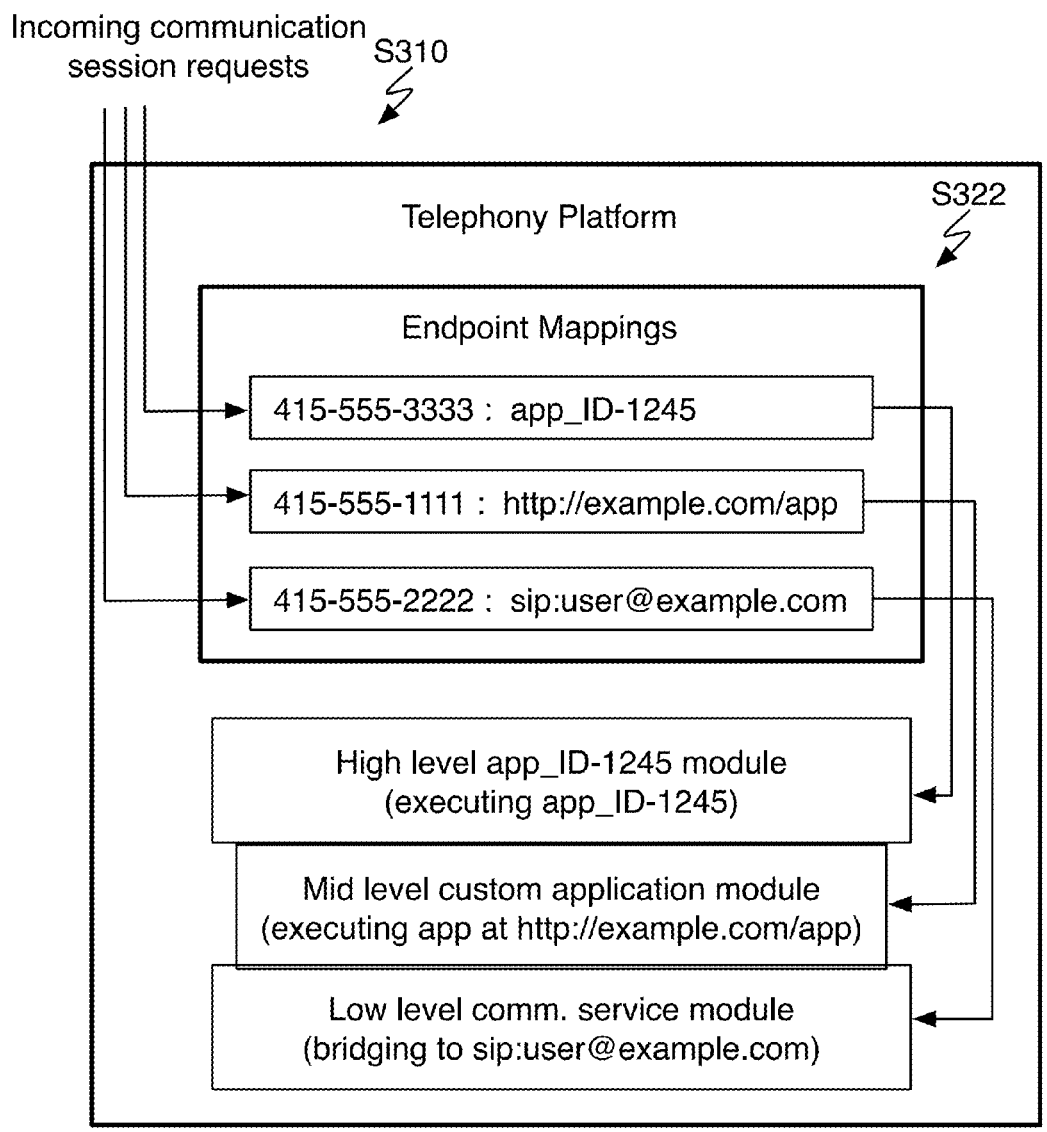
FIG. 16 is a schematic representation of detecting an initial operating state of a communication session.

The method can additionally include detecting an initial module of the communication session as determined by a mapping of an initial module of the communication endpoint S322 as shown in FIG. 16. An incoming communication will be directed at a communication endpoint managed by the communication session. The communication endpoint can be assigned to or owned by an account of the communication platform. The account owner (e.g., an application developer) can configure the endpoint to direct inbound calls to various types of modules. The dispatcher engine can be used to appropriately pass state control of the communication session to the appropriate resources. The mapping can include a communication endpoint address, an application URI or an application module identifier. If the mapping is a communication endpoint address, the communication session is preferably directed to a basic low level module, which can facilitate bridging or routing the communication to the specified endpoint. A specified endpoint can be a telephone number, a SIP address, a client application identifier, an account name, or any suitable addressable communication endpoint. If the mapping is an application URI or application identifier, the communication platform will preferably route communication control to an application processing module that can retrieve application media resources (e.g., document of instructions or playable media) as specified by the URI or identifier. If the mapping is a service module identifier, the communication session can be instantiated with the application logic of the associated service module identifier. The service module identifier can be associated with service provided by the communication platform or an outside third party entity. The service modules will preferably be run on top of a set of application processing resources such as those used in the application processing module.

In a low level operating module (e.g., a bridging module), connecting the communication session through a set of platform resources can include bridging an originating endpoint with a destination endpoint. The set of platform resources of the low level module preferably includes a limited number of resources of the communication platform. The low level module preferably provides low level functionality and as such uses resources specifically required for a specific objective. The set of platform resources used in a bridging module can include a communication bridge that is used to connect an outside endpoint to a second endpoint. Communication signaling is either controlled by the communication bridge or passed through the communication bridge. The communication bridge resource can bridge SIP calls, PSTN calls, conference calls, IP based client sessions, video sessions, and any suitable types of communications. The bridging module can function to provide a low cost, scalable mode that allows sustained communication between outside entities. The bridging module is preferably used during a communication session when at least two endpoints will communicate without the need of application logic manipulating the communication session, such as after a phone tree connects a caller with a selected party or when a customer is speaking with a customer representative. The communication platform can provide little if any dynamic logic control to manipulate the communication session when controlled by a bridging mode. In one variation, events and analytics can be read during the communication session. The method preferably provides a mechanism to alter the operating state of a communication session. In one variation, an API resource of the communication platform can be used to alter the operating state to transition to a new module. For example, while a call is bridged, an outside application server can asynchronously make an API request to transition operational state of the communication session to control by a module. In a second variation, a callback event mapping can be configured for a communication session when in the bridging mode. The callback event mapping can work similarly to the initial module mapping, and can transition a communication session to a specified operating state, endpoint connection, and/or module control. One exemplary event associated with a mapping can be a hangup event triggered when at least one leg of a communication session terminates (e.g., a connected destination endpoint hangs up).

In a middle level module (e.g., platform module, instruction processing module or application primitive module), connecting the communication session through a set of platform resources can include executing application logic during the communication session. The middle level application module preferably uses resources reserved for developer designed applications. The middle level application module preferably operates in a request/response model that uses responses of outside application servers to direct state of a communication session. However, the processed instructions may be obtained from any suitable source. The middle level application module preferably exposes a set of instruction primitives with which a developer can use to solve a variety of use cases. The platform instruction primitives can include a say verb (e.g., TTS of provided text), play verb (e.g., play an audio, video, or media file), gather verb (e.g., collect DTMF input or client application interface input), record verb (e.g., record audio or video from one or more endpoints in the communication session), message verb (e.g., send an asynchronous message), dial verb (e.g., connect to phone number, a SIP address, IP based client device, a conference call, or to an endpoint in a queue). Additional platform instruction primitives can include an enqueue verb (e.g., add a communication session to a queue), leave verb, hangup verb, redirect verb (e.g., retrieve telephony instructions from a different URI), reject, or pause verb. The middle level application module can be used when a developer has specific implementation guidelines or requirements. The middle level application module can further enable tight integration between the communication platform and the outside application server or platform. In exemplary use-cases a communication session can use the application mode for intermediary control session logic to determine where to direct callers either to various destination endpoints or to specific service. As with the modules described above, the middle level application module can transition between modules operated by different entities, which can be individually tracked and metered.

In a high level module (e.g., service module), connecting the communication session through a set of platform resources can include providing higher-level application control logic to control of a communication session. The service module preferably includes pre-defined application logic customized for particular use-cases. The service module preferably uses similar resources as the application mode but additionally includes application logic, media resources and computing resources to support the service. The service module of operating can be customized by a developer. In one variation, a developer or administrator can setup a service mode through a web interface where variables and options are defined. In a second variation, service specific primitives can be exposed that have particular behaviors and properties within the intended use of the service. For example, a customer service use-case may use an agent instruction primitive and a hold primitive used to direct callers to available agents.

Step S330, which includes receiving an instruction to transition communication control to a second module, functions to trigger a change in operating mode of a communication session. The received instruction will preferably specify the next operating mode and optionally properties of the next operating mode. The received instruction can be detected through the linking system described above such that the communication platform automatically changes operating mode according to the business logic flow of the communication session. When in a middle level application module or a service module, an instruction either in application instruction logic, the configuration of a service, or internal instruction logic of a service can invoke a change in the communication session. For example, a call verb that specifies a SIP destination endpoint may establish a sustained communication session between the caller and an outside endpoint. When processing the call verb, the communication session can automatically be transferred to a communication bridge resource. A transition instruction can alternatively be received through an asynchronous API request. An API request can asynchronous to the synchronous communication session interrupt the current state of communication session to direct the communication session to another module (e.g., destination endpoint, application, or service). In another variation, a transition instruction can be an event callback mapping. For example, an event could trigger a callback, and the operational mode can change according to the configuration of the callback. The callback could be configured with a URI of application instructions/media; the callback could be configured with a destination endpoint for routing to the session to that destination endpoint; the callback could be configured with an application identifier that can be processed by a linking system; and/or the callback could be configured in any suitable manner to specify a change in the operational mode. Different types of events can be configured to transition a communication session to another module.

Step S340, which includes transitioning communication control of the communication session to the second module, functions to change the module managing communication session state. Transitioning the communication session can include transitioning the communication to a higher level or to a lower level as shown in FIG. 17A. The second set of platform resources can be of any suitable operating module including those of the same level of operating mode. For example, a first application module can transition to a second application module using the application processing mode. When transitioning the communication session, the second set of platform resources take over communication state control, and accordingly the first set of platform resources release communication state control. Steps S330 and S340 can be repeated any suitable number of times during the duration of a communication session such that a communication session can transition between any number operational modes any number of times. Transitioning is preferably seamless and an interruption to the communication session is not experienced by an end user. Resources of the new module are preferably signaled to be invited to the communication session and resources of the old module can be uninvited from the communication session. The communication session identifier is similar maintained during the transitions.

Step S350, which includes independently metering resource usage of the communication session of each module, functions to track usage of different sets of resources. The resource usage is metered, tracked, or measured such that resource usage of a communication session can be broken down to at least usage associated with the first set of platform resources and usage associated with the second set of platform resources. In one implementation, usage can be individually metered for the bridging module, instruction-processing application module, and the service module. Similar to step S140, the dispatching engine, policy engine, or any suitable component of the communication platform can track the module managing communication state. The module can be application URI's, internal or connected communication endpoints. The time duration spent in different operational modes is preferably tracked for synchronous communication sessions. Alternatively, amount of data transfer, a count for different actions, or any suitable metric can be tracked. The metering initiates when the communication session is started and first connected and preferably ends when the communication session. The processing the initial module mapping and receiving the transition instruction can facilitate tracking the current operational state and the time spent in an operational state. Additionally or alternatively, the resources can log events of the communication session and these can be processed in realtime or at a later time to determine individual resource usage of a communication session.

Step S360, which includes accounting the metered usage of the communication session, functions to calculate, aggregate, or record accumulated usage across a communication session. A communication session can accumulate various levels of usage in different operational modes over the duration of a communication session. Accounting can occur at any suitable point. The accounting can be performed for an individual communication session after the communication session ends. Alternatively, accounting can be performed across multiple communication sessions or even during a communication session. For example, metered usage of different operational modes can be accumulated and accounted at the end of a billing period. Accounting can occur for a single communication session, multiple communication sessions, for communication sessions of a particular endpoint, for communication sessions of an account, or any suitable collection of communication sessions. Accounting can additionally include factoring in usage plans of different operation modes. Usage plans (e.g., billing rates) are individually assigned to different operational modes. Accordingly usage in different modes of operation can be billed at different rates. For example, the billing rate of a phone call (e.g., price per minute) can transition between different rates during a single phone call as the phone call is managed through different operational modules. As shown in FIG. 17B, usage rates based on time are applied to cumulative usage in different operational modes. A low level module can use fewer resources and accordingly can be assigned a usage plan with a lower usage cost; a middle level module can be assigned a usage plan cost great than the low level module; and a high level module can be assigned a usage plan cost greater than the low level operating mode and the middle level operating mode. Usage plans can additionally or alternatively differ in pricing models, and do not have to follow the same model as other operational modes. For example, a usage plan of one module can be a dollar for the first ten minutes and then ten cents every additional minute while another usage plan of a second module can be simply twenty cents per minute.

As an exemplary use of servicing a communication session in a multi-layered platform, an account can be used in a call center scenario. An account will have a phone number registered on the platform. Customers call the phone number when needing assistance of a customer care representative. Since call centers are a common use case, the platform (or a third party) may develop an application service with service level primitives tailored for call centers. The account configures the phone number to map incoming calls to the call center application service, and any incoming calls are initially started in a service level operational mode. The call center application manages directing a customer through a phone tree and connecting them to a customer care representative. When the customer is connected to the customer care representative the platform can automatically invoke a call routing module since the call is bridging two telephony endpoints without active application execution. If the account holder wanted to customize the call center application, a callback function/webhook could be configured to transfer call control to a custom telephone application (e.g., a customized survey at the end of the call). When the customer care representative hangs up or is transferred off the call, the call session can be transitioned to an application operational mode. In this example, the customer care flow used three operational modes. The service operational mode, a routing operational mode, and an application operational mode. The various modules were configured for use to minimize cost and to take advantage of provided functionality. Other exemplary use cases can include calling card use cases, conference call use cases, automated notification use cases, and numerous other exemplary use cases.

4. Method for Transitioning Between SIP Operational Modes

Figure 18:
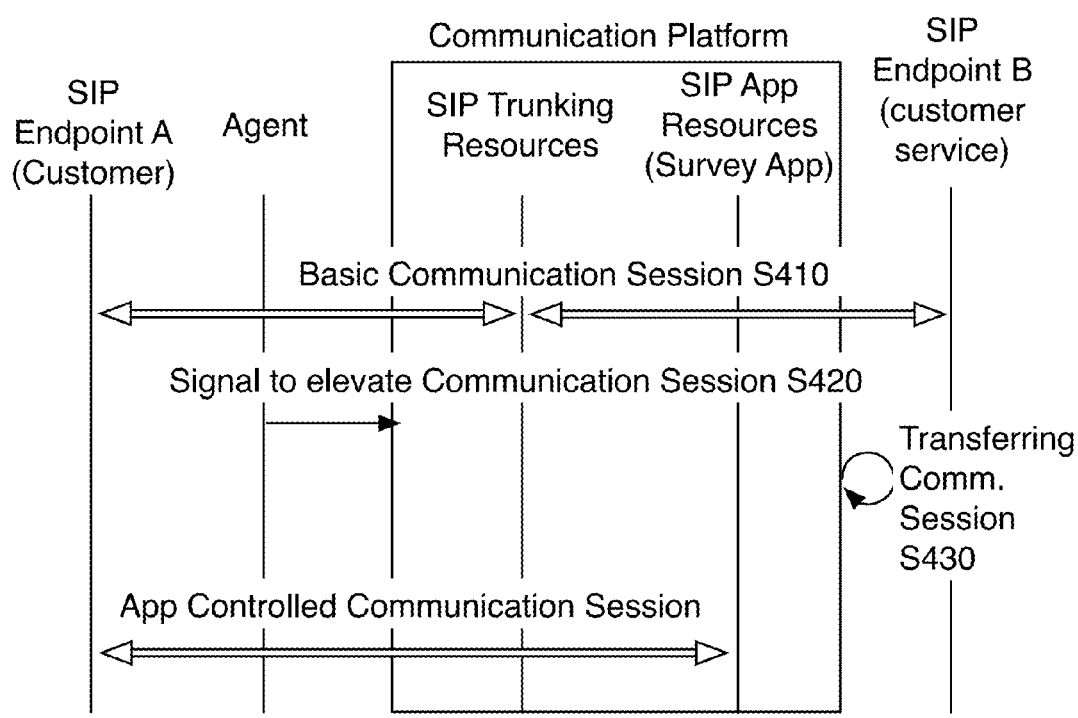
FIGS. 18 and 19 are sequence flow diagrams of methods for transitioning communication modes of a preferred embodiment.
Figure 19:
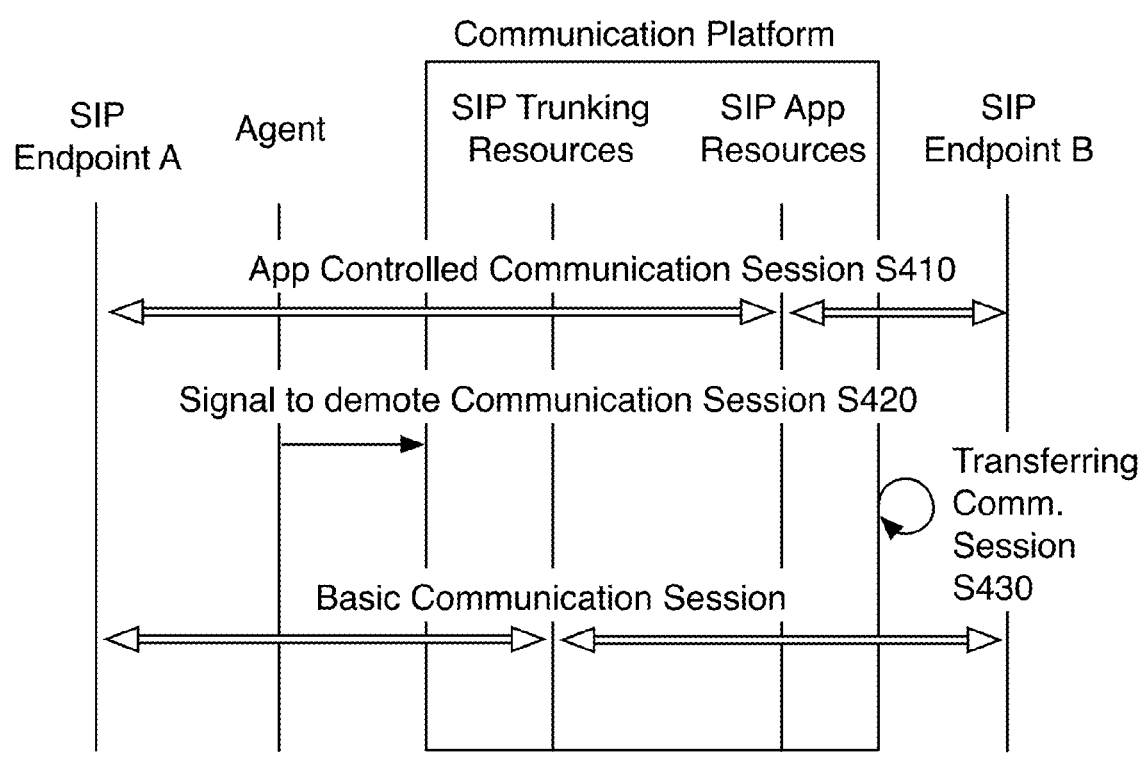

As shown in FIGS. 18 and 19, a more detailed method for transitioning between SIP operational modes of a preferred embodiment can include establishing SIP communication session in a first mode S410, receiving a transition signal S420 and altering the operational mode of the communication session S430, which functions to change the module and resources used in processing the communication session. The variation preferably functions to enable basic SIP communication sessions (e.g., SIP trunking communication sessions) to be elevated to a communication processed by the application stack of the communication platform as shown in FIG. 18. Similarly, the variation may be used to demote a communication session using application/processing resources to use less or basic communication sessions as shown in FIG. 19. The modules thus preferably include a basic module and an application stack communication module, but any alternative module may be used. In one variation, a module may be defined for a particular feature or set of features of the application mode. For example, a module may exist that routes the call through call recording resources. The basic communication module is preferably used when a call or communication session is established from SIP trunking. The communication platform preferably established the SIP communication session, which is ran through a SIP proxy of the communication platform. The application stack communication module is preferably used when a communication router uses a retrieved communication application when processing a communication. When in an application stack communication module, the SIP session preferably has full application capabilities. An application can preferably modify state of the SIP session and perform actions such as redirect the call, hang-up, record a conversation, transcribe a conversation, send an message (e.g., SMS, MMS, application message), merge the call, and/or to perform any suitable action.

Figure 20A:
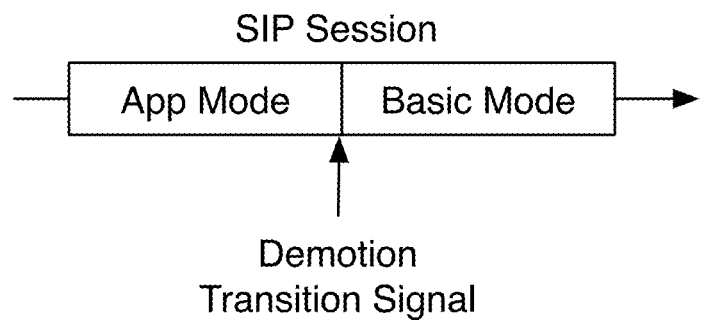
FIGS. 20A-20D are schematic timeline representations of promoting and demoting a communication session.
Figure 20B:
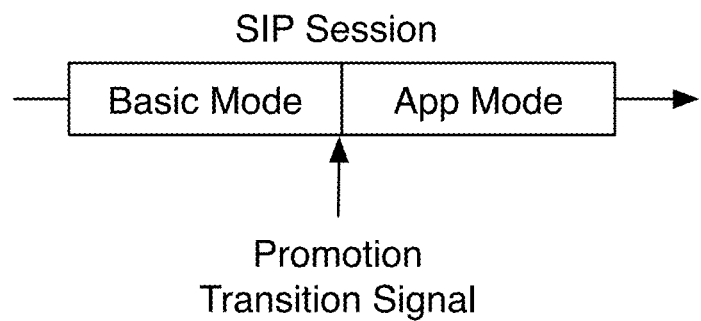
Figure 20C:
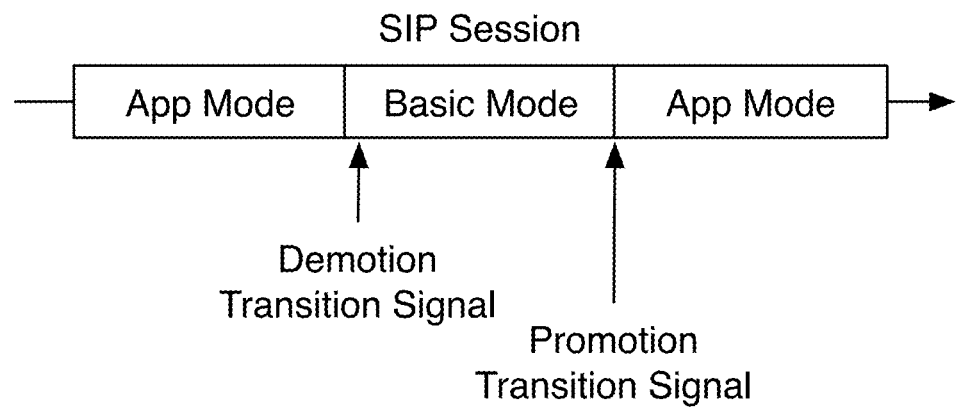
Figure 20D:
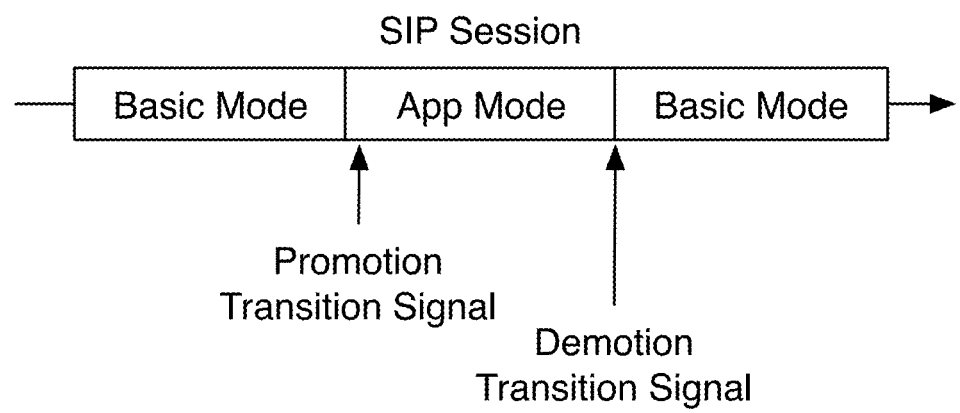

Step S410, which includes establishing SIP communication session in a first mode, functions to establish either a communication session in a basic, application, or another alternative communication mode. The method may be used to promote or demote the SIP communication mode. Additionally, modes may be changed any suitable number of times. As shown in FIG. 20A, a basic SIP communication mode may be promoted to use the capabilities of an application communication mode. As shown in FIG. 20B, a SIP session in an application communication module may be demoted to forgo the application capabilities and operate in a mode controlled by the basic SIP communication module. As illustrated in FIGS. 20C and 20D, the communication mode may switch multiple times. The established SIP communication is preferably established in a manner substantially similar to the methods described above, but the SIP session may alternatively be established in any suitable manner.

Step S420, which includes receiving a transition signal, functions to obtain identify a trigger to change modes of SIP communication. The transition signal may be received at any suitable point. In one variation, the transition signal may be communicated in a SIP message. Either party may be able to trigger the altering of the operational mode of the communication session. Preferably, the SIP signaling may include an application ID, an authentication token, and/or any other credentials to specify how to transition the communication (e.g., which app to give control to and indicate the request is authentic and/or authorized). The transition signal may alternatively be submitted through an API request (preferably a REST API request). The REST API preferably has a resource in which the SIP session may be accessed and acted upon. The REST API preferably specifies the new mode of operation and, in the case of promoting the communication to control by an application communication module, the REST API request may specify parameters for what application should initially control state. In yet another variation, a callback URI may be registered for a communication session and/or an endpoint so that the action may be triggered based on the SIP messages. For example, a callback may be registered for a basic SIP communication session so upon one of the endpoints hanging up the other endpoint is changed to an application communication module which may be pre-specified. When the communication session module is an application communication module, an instruction of the application may trigger the change in the operational mode, essentially ending the application control of that application communication module.

Step S430, which includes altering the operational mode of the communication session, functions to update the communication platform to use the appropriate resources to manage the communication session. When in a basic communication mode, the communication session is preferably routed through a SIP proxy of a basic communication module. When in an application communication mode, the communication session is preferably routed through at least a communication router of an application communication module where at least a portion of an application is performed/executed. When transitioning to the application communication module, the steps associated with initiating a communication session with the communication platform are preferably performed in a substantially consistent manner. In one variation, if the communication is returning to the application communication mode for a second time, the communication router may remember at least partial state within the processing of application instructions. For example, if an application transfers the call to a basic mode, and then the call is returned to the application, the instructions after the initial transfer may be performed without having to retrieve new application instructions.

In one exemplary implementation, a basic communication module may be provided by the communication platform at one usage rate and an application communication module provided at a second usage rate. SIP trunking can use basic communication where communication is preferably channeled between the communicating endpoints. Since facilitating the basic communication session requires fewer/cheaper resources, SIP trunking communication sessions may be offered to users for a lower price. An agent, application, or service can preferably submit a transition signal if an entity decides to dynamically change the basic communication to use features of an application or service of the communication platform. Upon transitioning to the elevated operational module, the communication session may be charged at a higher price rate for use of the application resources. The transition signal is preferably received through an API request, but may alternatively be received through any suitable channel. The variation of transitioning the operational module of a communication session may additionally or alternatively be used with the method of the second preferred embodiment or during any established communication session.

The altering of the SIP communication module may have numerous applications. In one exemplary use-case, an agent may be connected to a customer representative through a SIP session. The account associated with the phone number of the customer representative is preferably charged the basic communication mode rate (e.g., $0.001/min). When the customer representative has finished, a transition signal is preferably received, and the customer is seamlessly transitioned to a SIP communication session controlled by an application communication module. With the full capabilities of the application stack, a customer survey application may collect feedback from the customer before ending the call. During this survey application portion, the account may be charged an application customer mode rate (e.g., $0.01/min). In this example, the account was able to easily add a survey application without significantly increasing the cost of basic SIP communication. The communication module changes are preferably transparent to the customer. In another exemplary use-case, a customer may call an endpoint for a calling card service. The call preferably starts the communication session controlled by an application communication module. The customer enters the code, and specifies the destination they wish to call. The application then transfers them to the desired number. For the portion of the communication session with the desired endpoint, the communication session is preferably demoted to a basic communication session to benefit from a lower rate. The caller may additionally be transferred to an application communication mode at the end of the call for other application related services, such as reading the balance of the calling card and the option to call another number. The altering of the communication module may be used in any suitable application.

An alternative embodiment preferably implements the above methods in a computer-readable medium storing computer-readable instructions. The instructions are preferably executed by computer-executable components preferably integrated with a multi-layered communication application platform. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:
1. A method comprising: controlling a telephony communication application platform system to:
direct communication control of an established telephony communication session of the system to a first module, wherein the first module controls communication of the communication session for a first time period of the communication session;
during communication control of the telephony communication session by the first module, and responsive to direction to transfer control of the telephony communication session to a second module, transitioning communication control of the telephony communication session to the second module during the telephony communication session, wherein the second module controls communication of the communication session for a second time period of the communication session that is different from the first time period;
metering use of the first module during the first time period of the telephony communication session; and
metering use of the second module during the second time period of the telephony communication session; and
accounting the metered use of the first module for a unique identifier of the communication session according to a duration of the first time period and a first rate of a first usage plan of the first module; and accounting the metered use of the second module for the unique identifier according to a duration of the second time period and a second rate of a second usage plan of the second module,
wherein functionality of the first module is different from functionality of the second module.

2. The method of claim 1,
wherein the second module is a routing module having a second set of platform system resources,
wherein the first module is an application module having a first set of platform system resources, and
wherein the application module controls communication of the established telephony communication session according to a first set of application logic.

3. The method of claim 1,
wherein the first module is a routing module having a first set of platform system resources,
wherein the second module is an application module having a second set of platform system resources, and
wherein the application module controls communication of the established telephony communication session according to a first set of application logic.

4. The method of claim 1,
wherein the second module is a routing module having a second set of platform system resources,
wherein the first module is a service module having a first set of platform system resources, and
wherein the service module controls communication of the established telephony communication session according to a first set of application logic.

5. The method of claim 1,
wherein the first module is a routing module having a first set of platform system resources,
wherein the second module is a service module having a second set of platform system resources, and
wherein the service module controls communication of the established telephony communication session according to a first set of application logic.

6. The method of claim 1,
wherein the first module is a SIP communication module having a first set of platform system resources,
wherein the second module is an application communication module having a second set of platform system resources, and
wherein the application communication module controls communication of the established telephony communication session according to a first set of application logic.

7. The method of claim 1,
wherein the second module is a SIP communication module having a second set of platform system resources,
wherein the first module is an application communication module having a first set of platform system resources, and
wherein the application communication module controls communication of the established telephony communication session according to a first set of application logic.

8. The method of claim 1, wherein the first module has a first set of platform system resources, wherein the second module has a second set of platform system resources, and wherein the first set of platform system resources is different from the second set of platform system resources.

9. The method of claim 1, wherein the telephony communication session is a voice session.

10. The method of claim 1, wherein the telephony communication session is a video session.

11. The method of claim 1, wherein the telephony communication session is a multi-media messaging conversation.

12. The method of claim 8,
wherein the first set of platform system resources includes telephony application processing resources,
wherein directing communication control of the established telephony communication session of the system to the first module comprises: retrieving application instructions and executing the application instructions during the communication session,
wherein the second set of platform system resources includes communication routing services, and
wherein transitioning communication control of the telephony communication session to the second module comprises: routing the communication session between at least two communication endpoints.

13. The method of claim 8,
wherein the first set of platform system resources includes communication routing services,
wherein directing communication control of the established telephony communication session of the system to the first module comprises: routing the communication session between at least two communication endpoints,
wherein the second set of platform system resources includes telephony application processing resources, and
wherein transitioning communication control of the telephony communication session to the second module comprises: retrieving application instructions and executing the application instructions during the communication session.

14. The method of claim 13 wherein routing the communication session between at least two communication endpoints comprises: bridging at least one leg of the communication session over a SIP connection.

15. The method of claim 1,
wherein accounting the metered use of the first module according to the first usage plan comprises: aggregating use of the first module during the communication session, and
wherein accounting the metered use of the second module according to the second usage plan comprises: aggregating use of the second module during the communication session.

16. The method of claim 1, wherein the first usage plan is accounted at a rate different from a rate of the second usage plan, the method further comprising controlling the telephony communication application platform system to charge an account according to a combined accounted resource usage.

17. The method of claim 1,
wherein the first module includes a first set of platform resources of the platform system,
wherein the second module includes a second set of platform resources of the platform system that is different form the first set of platform resources of the first module,
wherein metering use of the first module comprises: tracking usage of the first set of platform resources,
wherein metering use of the second module comprises: tracking usage of the second set of platform resources, wherein the first module and the second module are included in the telephony communication application platform system.

18. The method of claim 17,
wherein metering use of the first module comprises: tracking duration of use of the first set of platform resources, the duration of use of the first set of platform resources being the duration of the first time period, and
wherein metering use of the second module comprises: tracking duration of use of the second set of platform resources, the duration of use of the second set of platform resources being the duration of the second time period.

19. The method of claim 1, wherein the communication session is a bi-directional synchronous call session.

20. The method of claim 1,
wherein the first module and the second module are included in the telephony communication application platform system, and
wherein for each module of the platform system that controls the communication session:
the platform system meters use of the module during each time period of the communication session during which the module controls communication of the communication session; and
the platform system accounts the metered use of the module according to a duration of each time period and a respective rate of the module.

\* \* \* \* \*

UNITED STATES PATENT AND TRADEMARK OFFICE
CERTIFICATE OF CORRECTION

PATENT NO. : 9,491,309 B2  
APPLICATION NO. : 14/933306  
DATED : November 8, 2016  
INVENTOR(S) : Jeff Lawson et al.

Page 1 of 1

It is certified that error appears in the above-identified patent and that said Letters Patent is hereby corrected as shown below:

In the Claims

In Column 26, Line 62, "form" should read "from"

Signed and Sealed this  
Seventh Day of March, 2017

Michelle K. Lee  
*Director of the United States Patent and Trademark Office*